United States Patent
Edminster et al.

(10) Patent No.: US 12,190,088 B1
(45) Date of Patent: Jan. 7, 2025

(54) PIPELINED SOFTWARE APPLICATION RELEASE

(71) Applicant: Liberty Mutual Insurance Company, Boston, MA (US)

(72) Inventors: Matthew Edminster, Portsmouth, NH (US); Jason Batchelder, Portsmouth, NH (US); Daniel Gagnon, Portsmouth, NH (US); Paul Finn, Portsmouth, NH (US)

(73) Assignee: Liberty Mutual Insurance Company, Boston, MA (US)

( * ) Notice: Subject to any disclaimer, the term of this patent is extended or adjusted under 35 U.S.C. 154(b) by 0 days.

(21) Appl. No.: 17/201,696

(22) Filed: Mar. 15, 2021

Related U.S. Application Data

(60) Provisional application No. 62/989,235, filed on Mar. 13, 2020.

(51) Int. Cl.
| | |
|---|---|
| *G06F 8/654* | (2018.01) |
| *G06F 8/36* | (2018.01) |
| *G06F 8/61* | (2018.01) |
| *G06F 8/71* | (2018.01) |
| *G06F 11/36* | (2006.01) |
| *H04L 9/32* | (2006.01) |
| *H04L 29/08* | (2006.01) |

(52) U.S. Cl.
CPC ............. *G06F 8/61* (2013.01); *G06F 8/36* (2013.01); *G06F 8/71* (2013.01); *G06F 11/3688* (2013.01)

(58) Field of Classification Search
CPC ..... G06F 8/61; G06F 8/36; G06F 8/71; G06F 11/3688
See application file for complete search history.

(56) References Cited

U.S. PATENT DOCUMENTS

| | | | |
|---|---|---|---|
| 7,376,719 B1 | 5/2008 | Shafer et al. | |
| 8,572,679 B1 * | 10/2013 | Wang | H04L 41/0813 370/328 |
| 8,997,088 B2 | 3/2015 | Gurikar et al. | |
| 9,454,351 B2 | 9/2016 | Anderson et al. | |

(Continued)

OTHER PUBLICATIONS

"Automated Release Notes For Jira," Amoeboids Technologies Pvt. Ltd., Atlassian Marketplace, (3 pages), [online], [Retrieved from the Internet Jun. 14, 2021] <https://marketplace.atlassian.com/apps/1215431/automated-release-notes-for-jira?hosting=cloud&tab=overview>.

(Continued)

*Primary Examiner* — S. Sough
*Assistant Examiner* — Mohammad H Kabir
(74) *Attorney, Agent, or Firm* — ALSTON & BIRD LLP

(57) ABSTRACT

Methods, apparatuses, systems, computing entities, and/or the like are provided. An example method may include retrieving a base image associated with at least one software application; generating a customized base image based at least in part on conducting at least one operational verification operation on the base image; generating a validated base image based at least in part on conducting at least one operational testing operation on the customized base image; generating a release note data object associated with the validated base image; and performing one or more image release operations by releasing the validated base image and the release note data object to at least one client system.

20 Claims, 8 Drawing Sheets

(56) References Cited

U.S. PATENT DOCUMENTS

| | | | |
|---|---|---|---|
| 9,477,454 | B2 | 10/2016 | Scheiner et al. |
| 9,785,431 | B2 | 10/2017 | Chen et al. |
| 9,910,654 | B1 | 3/2018 | Brigham et al. |
| 10,296,302 | B1 | 5/2019 | Ma et al. |
| 10,382,262 | B1 | 8/2019 | Gupta et al. |
| 10,389,651 | B2 | 8/2019 | Ferris et al. |
| 10,409,562 | B2 | 9/2019 | Leonelli et al. |
| 10,503,496 | B2 | 12/2019 | Natari |
| 10,824,414 | B2 * | 11/2020 | Kuchibhotla ............. G06F 8/60 |
| 10,877,735 | B1 | 12/2020 | Buck et al. |
| 10,884,767 | B2 | 1/2021 | Zhou |
| 10,929,378 | B1 | 2/2021 | Bigman et al. |
| 11,281,570 | B2 | 3/2022 | Zhou |
| 11,461,093 | B1 | 10/2022 | Edminster et al. |
| 11,474,814 | B1 | 10/2022 | Warfield et al. |
| 11,914,991 | B1 | 2/2024 | Warfield et al. |
| 2003/0005093 | A1 | 1/2003 | Deboer et al. |
| 2006/0190486 | A1 | 8/2006 | Zhou et al. |
| 2006/0277542 | A1 * | 12/2006 | Wipfel ...................... G06F 8/61 |
| | | | 717/174 |
| 2006/0291398 | A1 | 12/2006 | Potter et al. |
| 2008/0104573 | A1 | 5/2008 | Singla et al. |
| 2008/0271012 | A1 | 10/2008 | Eykholt |
| 2010/0131939 | A1 | 5/2010 | Hieb et al. |
| 2012/0311471 | A1 | 12/2012 | Bullard et al. |
| 2014/0149966 | A1 | 5/2014 | Binjrajka |
| 2014/0298321 | A1 | 10/2014 | Morino et al. |
| 2014/0304690 | A1 | 10/2014 | Wohlberg et al. |
| 2015/0067642 | A1 | 3/2015 | Chen et al. |
| 2015/0301824 | A1 | 10/2015 | Patton et al. |
| 2016/0269227 | A1 | 9/2016 | Alford et al. |
| 2017/0039035 | A1 | 2/2017 | Woodward |
| 2017/0083290 | A1 | 3/2017 | Bharthulwar |
| 2018/0083840 | A1 | 3/2018 | Poonen et al. |
| 2018/0267779 | A1 | 9/2018 | Leonelli et al. |
| 2018/0336027 | A1 | 11/2018 | Narayanan et al. |
| 2019/0012183 | A1 | 1/2019 | Saunders |
| 2020/0409690 | A1 * | 12/2020 | Rouland ............... H04L 9/3236 |
| 2021/0049002 | A1 * | 2/2021 | Myers ....................... G06F 8/71 |
| 2021/0096826 | A1 | 4/2021 | Duggal et al. |
| 2022/0164452 | A1 | 5/2022 | Landman |

OTHER PUBLICATIONS

"Automating Infrastructure Deployments In The Cloud With Terraform and Azure Pipelines," Azure DevOps Labs, May 31, 2021, (17 pages), (online), [Retrieved from the Internet Jun. 14, 2021] <https://azuredevopslabs.com/labs/vstsextend/terraform/>.

"Continuous Delivery Pipeline 101," Atlassian CI/CD, (11 pages), (article, online), [Retrieved from the Internet Jun. 14, 2021] <https://www.atlassian.com/continuous-delivery/pipeline>.

"Continuous Delivery Pipelines: Metrics, Myths, and Milestones," Slideshare, Jan. 24, 2018, (23 pages), (online), [Retrieved from the Internet Jun. 14, 2021] <https://www.slideshare.net/DevOpsWebinars/continuous-delivery-pipelines-metrics-myths-and-milestones>.

"Release Pipelines," Azure Pipelines, Microsoft, Dec. 16, 2020, (14 pages), (online), [Retrieved from the Internet Jun. 14, 2021] <https://docs.microsoft.com/en-US/azure/devops/pipelines/release/?view=azure-devops>.

"Run Automated Tests From Test Plans," Microsoft, Azure DevOps, Sep. 30, 2019 (19 pages), (online), [Retrieved from the Internet Jun. 14, 2021] <https://docs.microsoft.com/en-us/azure/devops/test/run-automated-tests-from-test-hub?view=azure-devops>.

"Use Pipelines As Code In Armory Enterprise," Armory Docs, (29 pages), (article, online), [Retrieved from the Internet Jun. 14, 2021] <https://docs.armory.io/docs/spinnaker-user-guides/using-dinghy/>.

Fennell, Richard (Black Marble). "Generate Release Notes (Crossplatform)," Visual Studio Marketplace, (9 pages), Apr. 12, 2017, (article, online), [Retrieved from the Internet Jun. 14, 2021] <https://marketplace.visualstudio.com/items?itemName=richardfennellBM.BM-VSTS-XplatGenerateReleaseNotes>.

Pujol, Johan. "Create Automatic Release Notes On AzureDevOps," Digikare, Jan. 24, 2019, (5 pages), (article, online), [Retrieved from the Internet Jun. 14, 2021] <https://medium.com/digikare/create-automatic-release-notes-on-azuredevops-f235376ec533>.

Szabo, Levente. "Save Time Emailing Release Notes From Jira Automatically," Midori, Oct. 15, 2018, (8 pages), (article, online), [Retrieved from the Internet Jun. 14, 2021] <https://www.midori-global.com/blog/2018/10/15/save-time-compiling-release-notes-with-automation-for-Jira-and-better-pdf-automation-for-jira>.

Moreno, Laura et al. "Automatic Generation of Release Notes," In Proceedings of the 22nd ACM SIGSOFT International Symposium on Foundations of Software Engineering, Nov. 11, 2014, pp. 484-495, DOI: 10.1145/2635868.2635870.

NonFinal Office Action for U.S. Appl. No. 17/201,704, dated Feb. 4, 2022, (37 pages), United States Patent and Trademark Office, USA.

NonPatent Office Action for U.S. Appl. No. 17/201,692, dated Mar. 3, 2022, (22 pages), United States Patent and Trademark Office, USA.

NonFinal Office Action for U.S. Appl. No. 17/822,203, dated Dec. 7, 2022, (16 pages), United States Patent and Trademark Office, US.

Notice of Allowance and Fee(s) Due for U.S. Appl. No. 17/201,692, dated Jun. 20, 2022, (15 pages), U.S. Patent and Trademark Office, US.

Notice of Allowance and Fee(s) Due for U.S. Appl. No. 17/201,704, dated Jun. 9, 2022, (15 pages), U.S. Patent and Trademark Office, US.

NonFinal Office Action for U.S. Appl. No. 17/930,248, dated Mar. 23, 2023, (20 pages), United States Patent and Trademark Office, US.

Final Office Action for U.S. Appl. No. 17/822,203, dated May 3, 2023, (14 pages), United States Patent and Trademark Office, US.

Notice of Allowance and Fees Due (PTOL-85) Mailed on Dec. 18, 2023 for U.S. Appl. No. 17/822,203, 7 page(s).

NonFinal Office Action for U.S. Appl. No. 17/822,203, dated Sep. 8, 2023, (13 pages), United States Patent and Trademark Office, US.

Notice of Allowance and Fees Due for U.S. Appl. No. 17/930,248, dated Oct. 4, 2023, (10 pages), United States Patent and Trademark Office, US.

Non-Final Rejection Mailed on Sep. 10, 2024 for U.S. Appl. No. 18/404,100, 25 page(s).

* cited by examiner

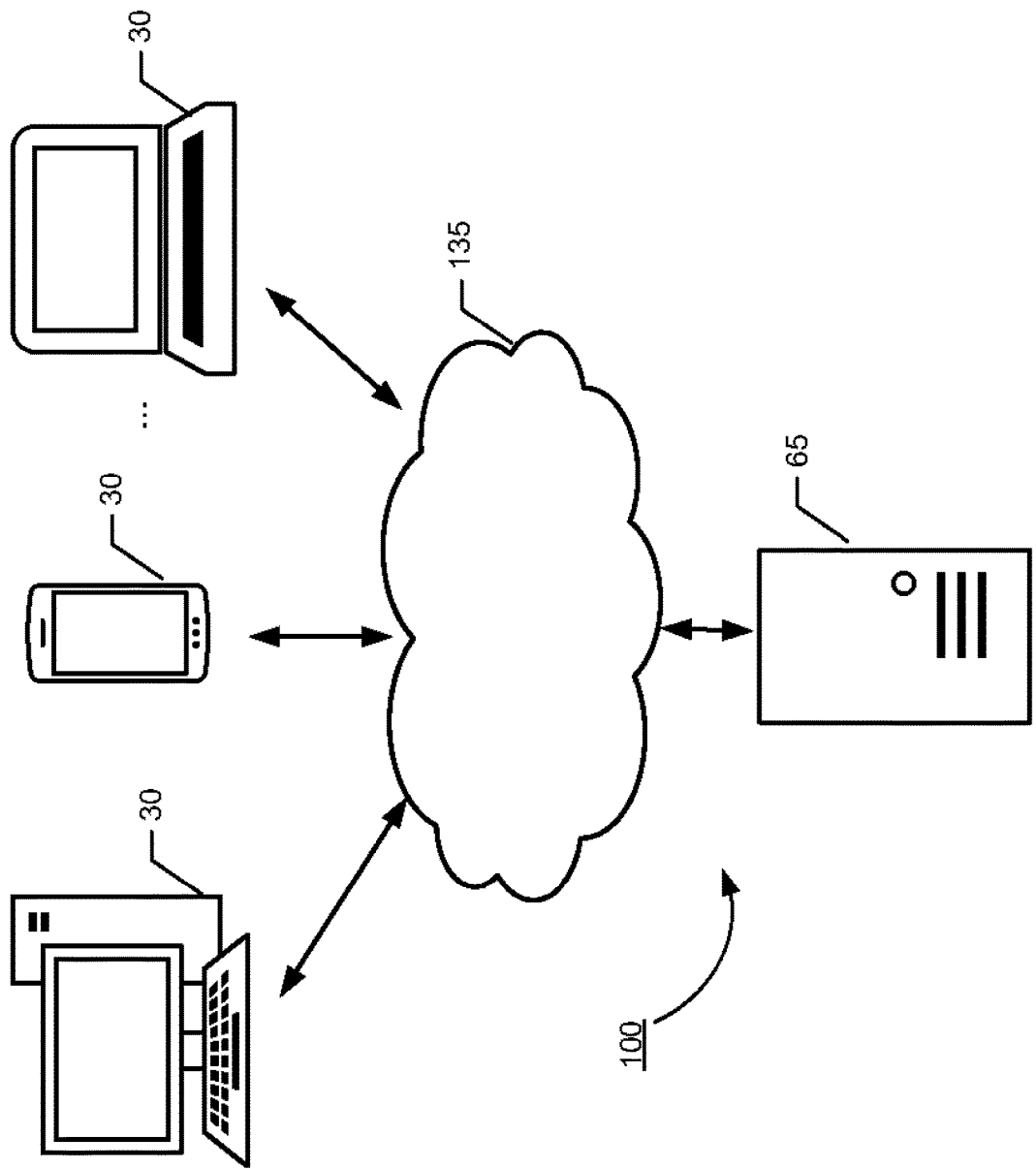

PIPELINED SOFTWARE APPLICATION RELEASE

CROSS-REFERENCES TO RELATED APPLICATIONS

The present application claims priority to the U.S. Provisional Patent Application No. 62/989,235 (filed Mar. 13, 2020), which is incorporated herein by reference in its entirety.

TECHNOLOGICAL FIELD

Embodiments of the present disclosure relate generally to managing the release of software applications (including, but not limited to, operating systems and/or third-party applications). In particular, examples of the present application provides an end-to-end, pipelined approach that are configured to validate and deploy new environment-specific and/or client-specific images to various cloud environments.

BACKGROUND

Applicant has identified many technical challenges and limitations associated with software image management.

BRIEF SUMMARY

In general, embodiments of the present disclosure provide methods, apparatuses, systems, computing devices, computing entities, and/or the like.

In accordance with various embodiments of the present disclosure, an apparatus is provided. The apparatus may comprise at least one processor and at least one non-transitory memory comprising a computer program code. The at least one non-transitory memory and the computer program code may be configured to, with the at least one processor, cause the apparatus to retrieve a base image associated with at least one software application; generate a customized base image based at least in part on conducting at least one operational verification operation on the base image; generate a validated base image based at least in part on conducting at least one operational testing operation on the customized base image; generate a release note data object associated with the validated base image; and perform one or more image release operations by releasing the validated base image and the release note data object to at least one client system.

In some embodiments, when retrieving the base image associated with the at least one software application, the at least one non-transitory memory and the computer program code are configured to, with the at least one processor, cause the apparatus to: retrieve a raw base image associated with the at least one software application; determine whether the raw base image comprises a latest software configuration file associated with the at least one software application; and in response to determining that the raw base image does not comprise the latest software configuration file, cause installation of the latest software configuration file on the raw base image to generate the base image.

In some embodiments, when generating the customized base image, the at least one non-transitory memory and the computer program code are configured to, with the at least one processor, cause the apparatus to: generate at least one configuration module based at least in part on at least one of the at least one software application or the at least one client system.

In some embodiments, the at least one configuration module describes at least one customized modification operation. In some embodiments, the at least one non-transitory memory and the computer program code are configured to, with the at least one processor, cause the apparatus to: conduct the at least one customized modification operation on the base image.

In some embodiments, the at least one configuration module describes at least one customized testing operation. In some embodiments, the at least one non-transitory memory and the computer program code are configured to, with the at least one processor, cause the apparatus to: conduct the at least one customized testing operation on the base image.

In some embodiments, the at least one operational testing operation comprises at least one general testing operation.

In some embodiments, the at least one operational testing operation comprises at least one integration testing operation.

In some embodiments, when generating the validated base image, the at least one non-transitory memory and the computer program code are configured to, with the at least one processor, cause the apparatus to: determine whether the customized base image passes the at least one operational testing operation; and in response to determining that the customized base image does not pass the at least one operational testing operation, generate at least one configuration module based at least in part on the at least one operational testing operation.

In accordance with various embodiments of the present disclosure, a computer-implemented method is provided. The computer-implemented method may comprise retrieving a base image associated with at least one software application; generating a customized base image based at least in part on conducting at least one operational verification operation on the base image; generating a validated base image based at least in part on conducting at least one operational testing operation on the customized base image; generating a release note data object associated with the validated base image; and performing one or more image release operations by releasing the validated base image and the release note data object to at least one client system.

In some embodiments, retrieving the base image associated with the at least one software application further comprises: retrieving a raw base image associated with the at least one software application; determining whether the raw base image comprises a latest software configuration file associated with the at least one software application; and in response to determining that the raw base image does not comprise the latest software configuration file, causing installation of the latest software configuration file on the raw base image to generate the base image.

In some embodiments, generating the customized base image further comprises generating at least one configuration module based at least in part on at least one of the at least one software application or the at least one client system.

In some embodiments, the at least one configuration module describes at least one customized modification operation. In some embodiments, the computer-implemented method further comprises conducting the at least one customized modification operation on the base image.

In some embodiments, the at least one configuration module describes at least one customized testing operation. In some embodiments, the computer-implemented method further comprises: conducting the at least one customized testing operation on the base image.

In some embodiments, the at least one operational testing operation comprises at least one general testing operation.

In some embodiments, the at least one operational testing operation comprises at least one integration testing operation.

In some embodiments, generating the validated base image further comprises: determining whether the customized base image passes the at least one operational testing operation; and in response to determining that the customized base image does not pass the at least one operational testing operation, generating at least one configuration module based at least in part on the at least one operational testing operation.

In accordance with various embodiments of the present disclosure, a computer program product is provided. The computer program product may comprise at least one non-transitory computer-readable storage medium having computer-readable program code portions stored therein. The computer-readable program code portions may comprise an executable portion configured to retrieve a base image associated with at least one software application; generate a customized base image based at least in part on conducting at least one operational verification operation on the base image; generate a validated base image based at least in part on conducting at least one operational testing operation on the customized base image; generate a release note data object associated with the validated base image; and perform one or more image release operations by releasing the validated base image and the release note data object to at least one client system.

In some embodiments, when retrieving the base image associated with the at least one software application, the computer-readable program code portions comprise the executable portion configured to: retrieve a raw base image associated with the at least one software application; determine whether the raw base image comprises a latest software configuration file associated with the at least one software application; and in response to determining that the raw base image does not comprise the latest software configuration file, cause installation of the latest software configuration file on the raw base image to generate the base image.

In some embodiments, when generating the customized base image, the computer-readable program code portions comprise the executable portion configured to: generate at least one configuration module based at least in part on at least one of the at least one software application or the at least one client system.

In some embodiments, the at least one configuration module describes at least one customized modification operation. In some embodiments, the computer-readable program code portions comprise the executable portion configured to: conduct the at least one customized modification operation on the base image.

The above summary is provided merely for purposes of summarizing some example embodiments to provide a basic understanding of some aspects of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is an example diagram of an example system that can be used in conjunction with various embodiments of the present invention;

DETAILED DESCRIPTION OF SOME EXAMPLE EMBODIMENTS

Figure 2A:
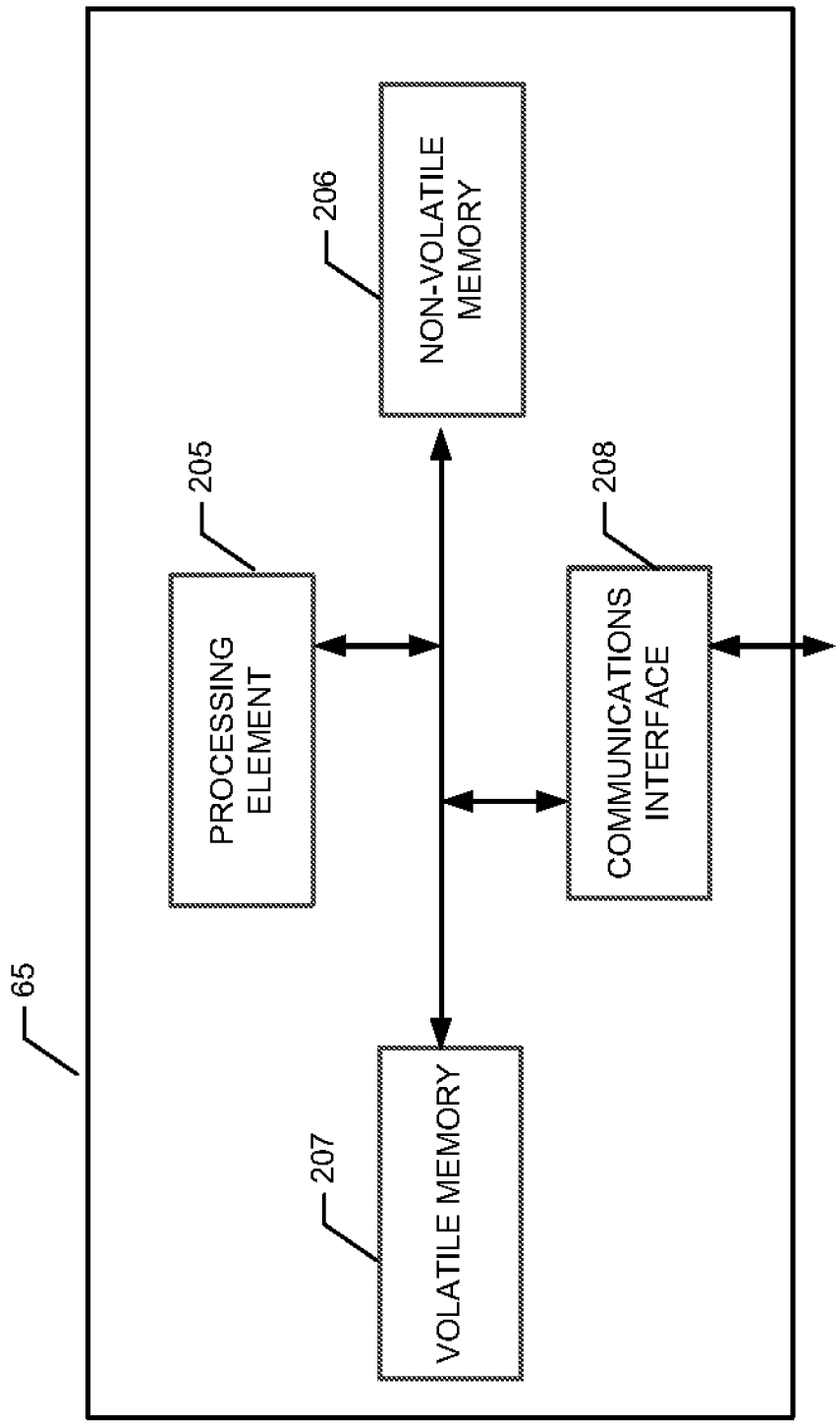
FIG. 2A is an example schematic representation of an example central computing entity in accordance with certain embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout.

I. Overview

Various embodiments of the present disclosure relate generally to software application deployment management. In particular, examples of the present application provide an end-to-end approach for managing the release of software applications.

As described above, there are technical challenges, deficiencies and problems associated with software image management. For example, many systems require a system administrator to manually test and/or deploy a software application, which can be time and resource consuming and may introduce human error during the testing/deployment process. Various embodiments of the present disclosure overcome the above-referenced technical challenges, deficiencies and problems. For example, example embodiments of the present disclosure utilize a combination of operational verification operations (e.g., operational verification operations based at least in part on per-client application configuration data, per-application configuration data, and per-client per-application configuration data) and testing operations to prepare one or more validated base images for release/distribution to the client system. By doing so, example embodiments of the present disclosure eliminate the need for manual testing and deploying of software applications.

As such, various embodiments of the present disclosure reduce the labor required to test and deploy software applications, shorten the time needed to release a software application to the end user, eliminate testing human error and improve success rate by sharing a similar code base across different platforms. Various embodiments of the present disclosure may further reduce duplication and infrastructure cost, improve collaboration and resource usage efficiency, and increase predictability and/or consistency of operations in software application configuration management.

II. Definitions

In the present disclosure, the term "data object" may refer to a data structure that represents one or more functionalities and/or characteristics (e.g., feature) associated with data and/or information. In some embodiments, the data object may comprise one or more metadata. The term "metadata" may refer to to a parameter, a data field, a data element, or the like that describes an attribute of a data object. In some embodiments, metadata may include text string(s), numerical character(s), alphabetical character(s), alphanumeric code(s), American Standard Code for Information Interchange (ASCII) character(s), and/or the like.

In the present disclosure, the term "image" may refer to a data object that represents a replica of data, information, configurations, and/or contents that are stored in a physical computer storage device (such as, but is not limited to, a hard disk drive, a compact disc read-only memory (CD-ROM, and/or the like) and/or a virtual storage system (for example, in a cloud computing environment where multiple network storage devices are interconnected with one another).

An example image in accordance with the present disclosure may be generated to represent a virtual machine that can be deployed in an enterprise environment. In an example enterprise environment, system administrator(s) manage a high number of servers that are configured to deliver applications and/or services to others (such as, but is not limited to, another user within the same organization, a consumer that is outside the organization, and/or the like). By generating, customizing, validating, and deploying images, system administrator(s) in the example enterprise environment are able to reduce duplication and infrastructure cost, improve collaboration and resource usage efficiency, and increase predictability and/or consistency of operations in the example enterprise environment.

In some embodiments, an image may be generated, stored and/or transmitted in a non-volatile form. In some embodiments, an image may be generated, stored, and/or transmitted in the format of a disk image file (such as an optical disc image (ISO) file). In some embodiments, an image may be generated, stored, and/or transmitted as a computer file that is formatted in accordance with the specifications of one or more computer visualization and/or emulation applications. For example, an image may be generated, stored, and/or transmitted in the format of an Open Virtualization Appliance (OVA) file, which may be used by visualization/ emulation applications such as VMware® (which, additionally, or alternatively, may be installed on premises in a network computing system). As another example, an image may be generated, stored, and/or transmitted in the format of an Amazon Machine Image (AMI) file, which may be used by Amazon® Simple Storage Service (S3) for storage (which is stored in a cloud computing storage). As another example, an image may be generated, stored, and/or transmitted in the format of a Virtual Machine Image (VMI) file, which may be used by cloud computing services such as, but is not limited to, Microsoft® Azure®.

In some embodiments, once an image is generated (for example, by the system administrator(s)), the image may be transmitted through one or more networked computing systems for deployment and/or distribution to a client system. For example, an example image may be deployed and/or distributed to a cloud environment, computing system and/or service such as, but is not limited to, Amazon® Web Service, Microsoft® Azure® Shared Image Gallery, and/or the like. In such an example, the cloud computing system and/or service comprise a plurality of remote servers that are configured to enable multiple client systems within the enterprise environment (within the same region or across different regions), and/or outside the enterprise environment, to operate, access, and/or utilize the image. As another example, an example image may be deployed and/or distributed through a local, on-premise computer network that is within the enterprise environment to multiple client systems within the enterprise environment (within the same region or across different regions), and/or client systems outside the enterprise environment when the local, on-premise computer network is connected to the Internet.

In accordance with various embodiments of the present disclosure, an example image may be associated with at least one software application. For example, an example image may comprise data, information, configurations, and/or contents that are related to the at least one software application. In the present disclosure, the terms "software" or "software application" may refer to a collection of computing instructions and data that can be executed by a processing circuitry (for example, a processor) to conduct one or more operations, perform one or more services, and provide one or more functionalities. For example, a software application may be in the form of an operating system, which is a software application that manages the hardware and/or resource of a computing device and provides one or more basic functions (such as, but not limited to, scheduling tasks, executing applications, and controlling peripherals). As another example, a software application may be in the form of a third-party application, which may be installed on the operating system to expand the functions of the computing device.

In some embodiments, an example image may comprise data, information, configurations, and/or contents that are associated with an example operating system. Examples of operating systems may include, are not limited to, server operating system such as, but not limited to, Windows Server 2016®, Windows Sever 2019®, Linux, Ubuntu, and/or the like.

While the description above provides examples of operating systems that may be implemented in accordance with embodiments of the present disclosure, it is noted that the scope of the present disclosure is not limited to the description above. For example, examples of operating systems may include computer operating systems (such as, but not limited to, Microsoft® Windows®, Apple® MacOS®, Unix, Linus, etc.), smart phone operating systems (such as, but not limited to, Apple® iOS®, Google® Android®), tablet operating systems (such as, but not limited to, Apple® iPadOS®), wearable operating systems (such as, but not limited to, Apple® WatchOS®), and/or the like.

Additionally, or alternatively, an example image may comprise data, information, configurations, and/or contents that are associated with one or more third-party applications. For example, an example image may comprise third-party applications that are required to deliver a service or a portion of a service to a client system. For example, an example image may comprise data, information, configurations, and/or contents associated with an antivirus software application that is configured to prevent, detect, and/or remove computer virus, spyware, malware, and/or the like. Additionally, or alternatively, an example image may comprise data, information, configurations, and/or contents that are associated with productivity software applications that are configured to provide functionalities such as, but not limited to, word processing functionalities, spreadsheet calculation functionalities, presentation generation functionalities, database functionalities, email/communication functionalities, and/or the like. Additionally, or alternatively, an example image may comprise data, information, configurations, and/or contents that are associated with other applications.

In the present disclosure, the term "base image" may refer to an image that is associated with at least one software application (such as, but not limited to, an operating system, one or more third-party applications) as described above. For example, the base image may be an image of a server operating system such as, but not limited to, Windows Server 2016®, Windows Sever 2019®, Linux, Ubuntu, and/or the like. Additionally, or alternatively, the base image may be an image of one or more third-party applications, such as, but not limited to, an antivirus software application, a productivity software application, and/or the like. Additionally, or alternatively, the base image may be an image of both an operating system and one or more third-party applications, where the one or more third-party applications are installed on the operating system.

In some embodiments, an example base image of a software application may include all of the latest software configuration files for the software application. For example, an image of a Microsoft® Windows® software application may include the latest security patches that fix one or more vulnerabilities in the operating system. As another example, an image of a Ubuntu® software application may include the latest security patches that fix one or more vulnerabilities in the operating system.

In some embodiments, an example base image may be generated by updating a raw base image. In the present disclosure, the term "raw base image" may refer to an image that may or may not include all of the latest software configurations for the software application. For example, a raw base image may not include the latest security patches that fix one or more vulnerabilities in the operating system. In some embodiments, a computing entity (such as the central computing entity 65 described herein) may be configured to update the raw base image of the software application by installing the required latest software configuration files for the software application. For example, the computing entity may retrieve the latest security patches for a raw base image of a Windows® operating system and update the raw base image by applying the latest security patches to generate a base image for the Windows® operating system. As another example, the computing entity may retrieve the latest security patches for a raw base image of an Ubuntu® operating system and update the raw base image by applying the latest security patches to generate a base image for the Ubuntu® operating system.

In the present disclosure, the term "customized base image" may refer to an image that is generated by conducting at least one operational verification operation on a base image. In some embodiments, an image is either modified or operationally verified or both in order to generate a customized base image.

In the present disclosure, an "operational verification operation" may refer to a data object that describes a required modification on the software applications and/or the images associated with software applications, and/or or a required testing operation for the software applications and/or the images associated with software applications so that the resulting customized base image satisfies one or more requirements (for example, requirements from the enterprise environment, form the end user, and/or the like).

In some embodiments, an operational verification operation may be a modification operation. In the present disclosure, a "modification operation" may refer to a data operation on an image (for example, a base image) and/or a software application (for example, operating system, third-party application) that modifies one or more parameters of the image and/or software application, such that resulting image (for example, a customized base image) and/or software application satisfies the requirements from the enterprise environment, form the end user, and/or the like. For example, in conducting a modification operation, a processing circuitry may unpack the base image and extract one or more files from the base image. Examples of modification operations may include, but not limited to, editing one or more files within the base image, removing the one or more files within the base images, adjusting the settings of one or more files within the base image, and/or the like.

In some embodiments, an operational verification operation may be a testing operation. In the present disclosure, a "testing operation" may refer to a data operation on the image (for example, base image) and/or a software application (for example, operating system, third-party application) that tests the image and/or the software application, such that resulting image (for example, a customized base image) and/or the software application satisfies the requirements from the enterprise environment, form the end user, and/or the like. For example, in conducting a testing operation, a processing circuitry may create a sandbox environment, execute the image and/or the software application, and determine whether one or more errors have occurred.

In the present disclosure, the term "configuration module" may refer to a data object that describes one or more operational verification operations, such as one or more post-development modification operations that should be conducted on a corresponding software application or an image prior to release/deployment of the software application or the image on the client system, and/or one or more post-development testing operations that correspond to the one or more post-development modification operations. In some embodiments, when a configuration module is executed by a processing circuitry, the processing circuitry may carry out modification operation(s) and testing operation(s) to modify and/or test an image in accordance with those described by the configuration module. For example, a configuration module may be in the form of a file with scripted steps and logic to reach a goal (modification, testing, etc.)

In the present disclosure, the term "validated base image" may refer to an image that is generated by conducting at least one operational testing operation on a customized base image. In the present disclosure, an "operational testing operation" may refer to a data object that describes a universal testing that is required for all software applications and/or images associated with said software applications prior to deploying/releasing software applications and/or images to any environment (for example, any client system) to ensure that the resulting validated base image satisfies one or more requirements (for example, requirements from the enterprise environment, form the end user, and/or the like).

For example, the operational testing operation may be in the form of a general testing operation, which is a type of testing operation for all the images and/or software applications regardless of different formats of the images and/or software applications, and regardless of different operating systems associated with the images and/or the software applications. As an example, a general testing operation may be a security scan on the customized base image. In some embodiments, if the customized base image successfully passes the general testing operation, a processing circuitry may determine that the customized base image is a validated base image. In some embodiments, if the customized based image does not pass the general testing operation, a processing circuitry may determine that the customized base image is not a validated base image, and may further generate a validated base image by conducting one or more modification operations on the customized base image so that it passes the general testing operation.

As another example, the operational testing operation may be in the form of an integration testing operation, which is a type of testing operation that is configured to test the compatibilities of various modification operations that have been conducted on the software application and/or on the image after the software application and/or the image has been developed (for example, those modifications as described by the configuration module). As an example, an integration testing operation may be a compatibility check on the customized base image. In some embodiments, if the customized base image successfully passes the integration testing operation, a processing circuitry may determine that the customized base image is a validated base image. In some embodiments, if the customized based image does not pass the integration testing operation, a processing circuitry may determine that the customized base image is not a validated base image, and may further generate a validated base image by conducting one or more modification operations on the customized base image so that it passes the integration testing operation.

In the present disclosure, the term "release note data object" may refer to a data object that comprises data and/or information describing the content associated with an image and/or a software application that is to be deployed or released to one or more client systems (for example, a validated base image as described above). In various embodiments of the present disclosure, release note data objects may have different structures and/or formats.

In some embodiments, the release note data object may have a structured document format, such as a JavaScript Object Notation (JSON) or Extensible Markup Language (XML) format, and may define desired data item types using structured tags (e.g., JSON tags or XML tags) within the structured document tag.

In some embodiments, the release note data object may be in the form of text string(s), numerical character(s), alphabetical character(s), alphanumeric code(s), American Standard Code for Information Interchange (ASCII) character(s), and/or the like. For example, the release note data object may be in the form of, such as but not limited to, an electronic message, an electronic mail, a short message service (SMS) message, and/or the like. As another example, the release note data object may be in the form of, such as but not limited to, a text file such as .txt and/or a Microsoft Word file.

In some embodiments, the release note data object may comprise computing instructions that, when executed by the client system, cause the client system to carry out one or more operations such as, but not limited to, triggering the display of a notification that indicates the release/deployment of the image (for example, a validated base image) and/or the software application, and/or a notification that describes the content associated with an image and/or a software application that is to be deployed or released to one or more client systems (for example, a validated base image as described above).

As used herein, the term "module" may be a data object that comprises a self-contained collection of data and instructions for a set of configuration operations associated with the module. An example of a module is a software virtualization container, such as a Docker container.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 provides an illustration of a pipelined image release platform/system 100 that can be used in conjunction with various embodiments of the present invention. As shown in FIG. 1, the pipelined image release platform/system 100 may comprise one or more central computing entities 65, one or more user computing entities/client systems 30, one or more networks 135, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities, the various embodiments are not limited to this particular architecture.

a. Exemplary Central Computing Entity

FIG. 2A provides a schematic of a central computing entity 65 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the central computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the central computing entity 65 may communicate with other computing entities, one or more user computing entities 30 (also referred to as "client systems" herein), and/or the like.

As shown in FIG. 2A, in one embodiment, the central computing entity 65 may include or be in communication with one or more processing elements 205 (also referred to as processors, processing circuitry, and/or similar terms used herein interchangeably) that communicate with other elements within the central computing entity 65 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the central computing entity 65 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, metadata repositories database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to may refer to a structured or unstructured collection of information/data that is stored in a computer-readable storage medium.

Memory media 206 (e.g., metadata repository) may also be embodied as a data storage device or devices, as a separate database server or servers, or as a combination of data storage devices and separate database servers. Further, in some embodiments, memory media 206 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the information/data required for the operation of the system may be stored. In some embodiments, the information/data required for the operation of the system may also be partially stored in the cloud data storage system and partially stored in a locally maintained data storage system.

Figure 2B:
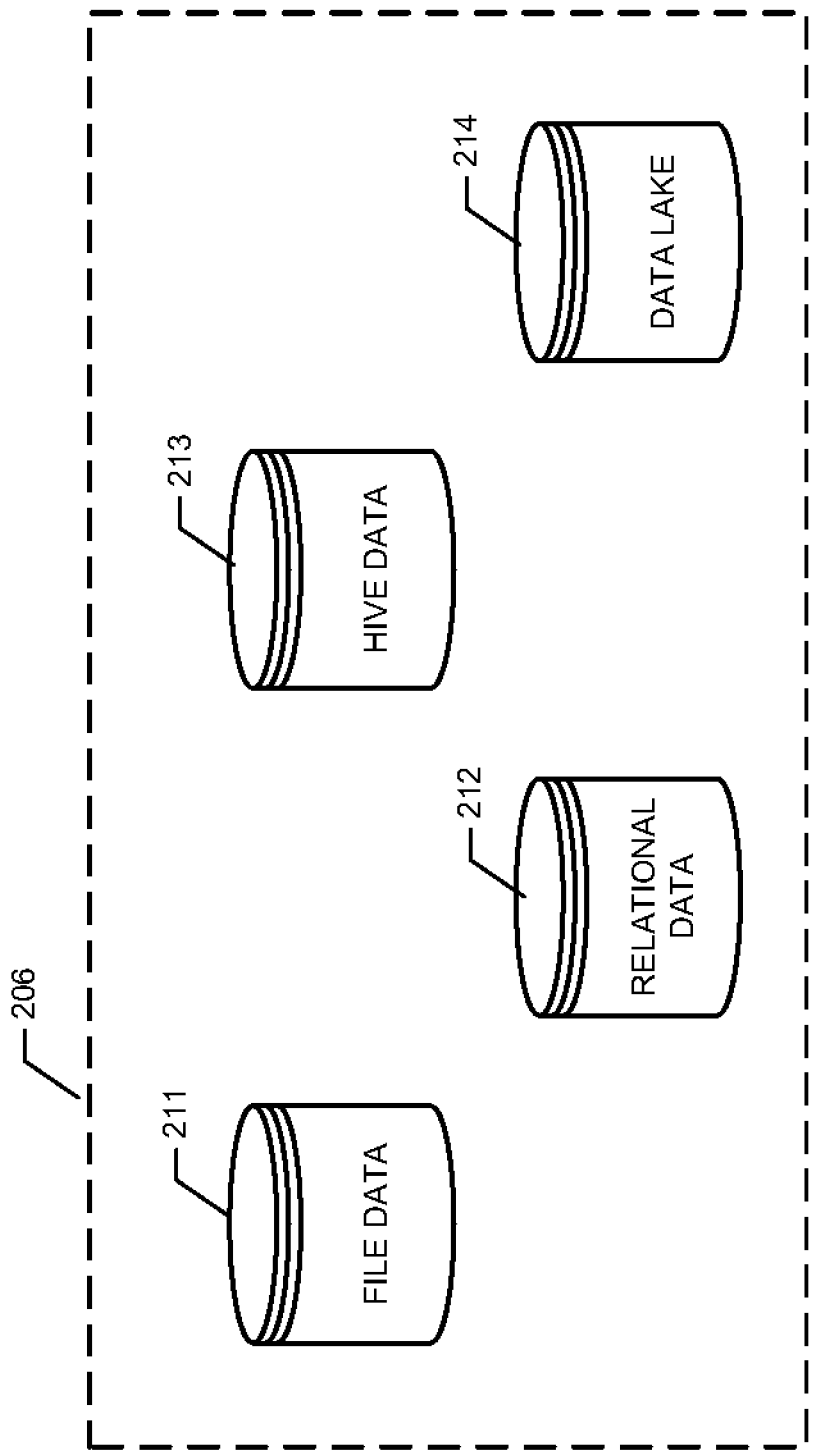
FIG. 2B is an example schematic representation of an example memory media storing a plurality of data assets.

Memory media 206 (e.g., metadata repository) may include information/data accessed and stored by the system to facilitate the operations of the system. More specifically, memory media 206 may encompass one or more data stores configured to store information/data usable in certain embodiments. For example, as shown in FIG. 2B, metadata for data assets may be stored in metadata repositories encompassed within the memory media 206. The metadata for the data assets in the metadata data stores, metadata repositories, and similar words used herein interchangeably may comprise file information/data 211, relational information/data 212, Hive information/data 213, data lake information/data 214, and/or various other types of information/data.

In one embodiment, the central computing entity 65 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the central computing entity 65 with the assistance of the processing element 205 and operating system.

As indicated, in one embodiment, the central computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the central computing entity 65 may communicate with computing entities or communication interfaces of other computing entities 65, user computing entities 30, and/or the like.

As indicated, in one embodiment, the central computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the central computing entity 65 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The central computing entity 65 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the central computing entity's components may be located remotely from other central computing entity 65 components, such as in a distributed system. Furthermore, one or more of the components may be aggregated and additional components performing functions described herein may be included in the central computing entity 65. Thus, the central computing entity 65 can be adapted to accommodate a variety of needs and circumstances.

b. Exemplary User Computing Entity

Figure 3:
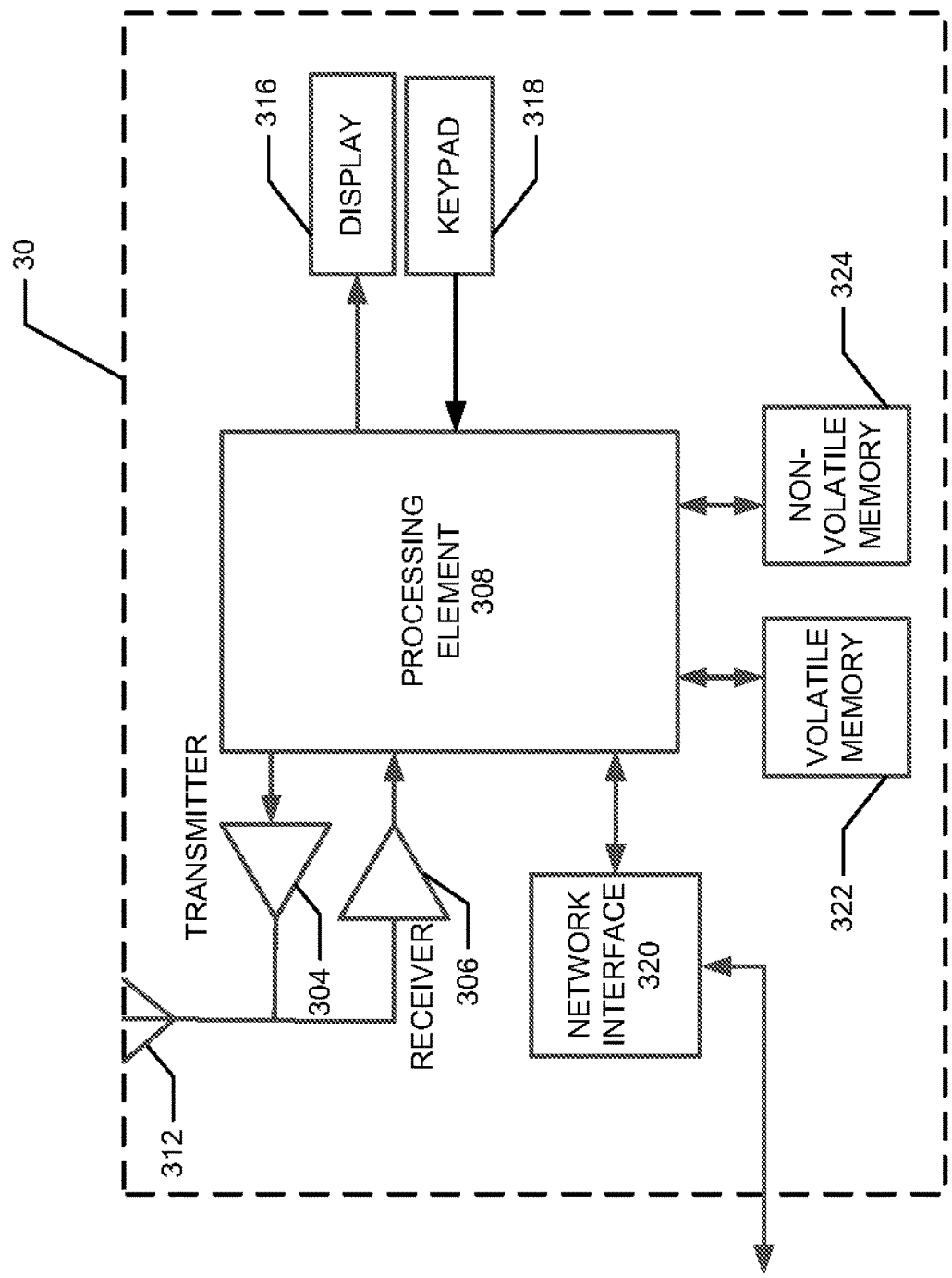
FIG. 3 is an example schematic representation of an example user computing entity in accordance with certain embodiments of the present invention.

FIG. 3 provides an illustrative schematic representative of user computing entity 30 that can be used in conjunction with embodiments of the present invention. As will be recognized, the user computing entity may be operated by an agent and include components and features similar to those described in conjunction with the central computing entity 65. Further, as shown in FIG. 3, the user computing entity may include additional components and features. For example, the user computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a central computing entity 65, another user computing entity 30, and/or the like. In this regard, the user computing entity 30 may be capable of operating with one or more air interface standards, communication protocols, modulation types, and access types More particularly, the user computing entity 30 may comprise a network interface 320, and may operate in accordance with any of a number of wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user output interface may be updated dynamically from communication with the central computing entity 65. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Networks

In one embodiment, the networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. Exemplary System Operations

Reference will now be made to FIGS. 4, 5, 6, and 7, which provide flowcharts and diagrams illustrating example steps, processes, procedures, and/or operations associated with a pipelined image release platform/system and/or one or more central computing entities in accordance with various embodiments of the present disclosure.

a. Exemplary Software Application Release Pipeline

Figure 4:
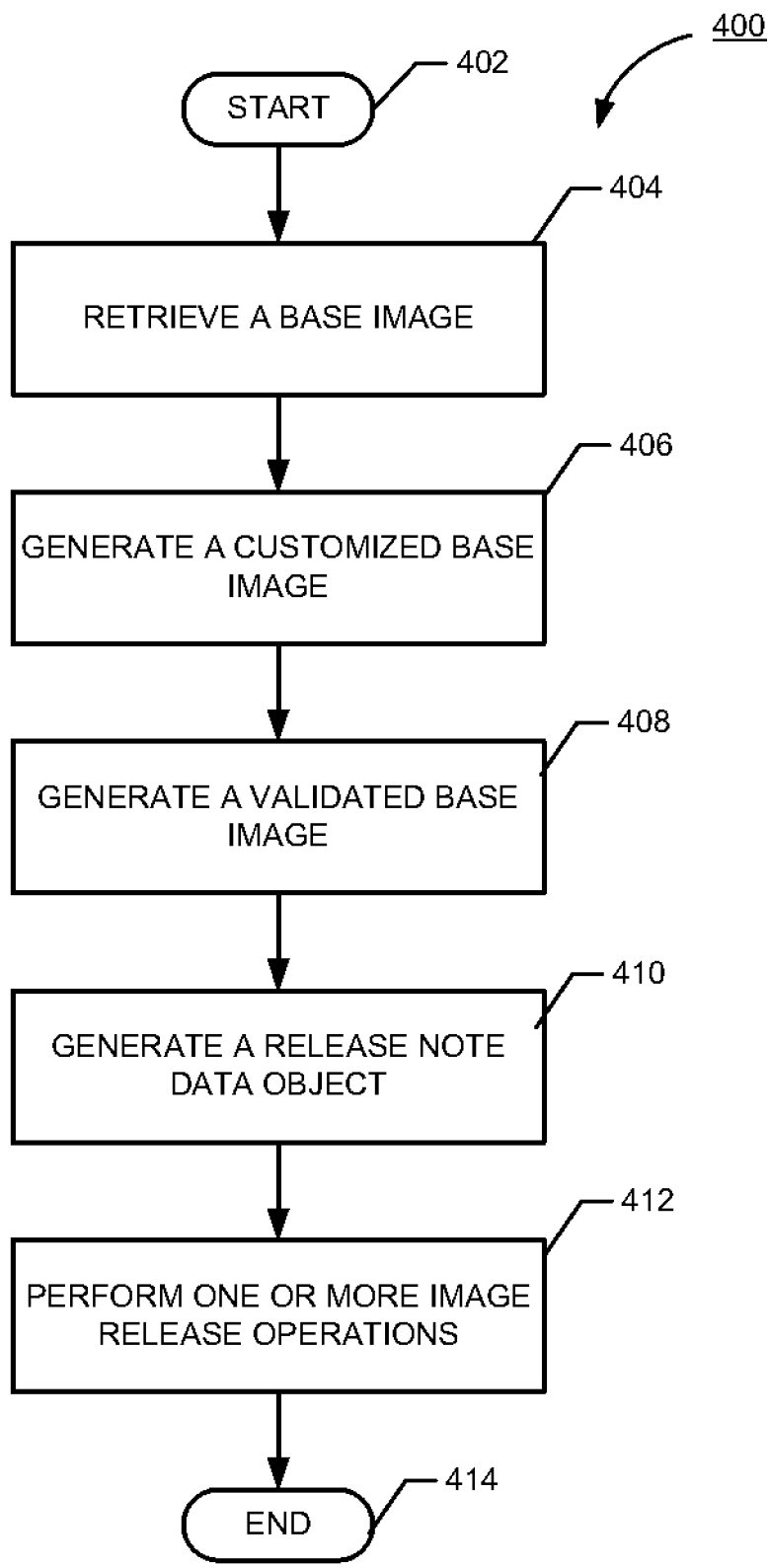
FIG. 4 is an example flowchart diagram of an example process for pipelined image release in accordance with certain embodiments of the present invention.

Referring now to FIG. 4, an example flowchart diagram is illustrated. In particular, the example flowchart diagram illustrates an example process 400 for pipelined software release for release/deployment of a software application to a client system in accordance with examples of the present disclosure.

In some embodiments, via the various steps/operations of the example process 400, a processing circuitry (such as, but not limited to, the processing elements 205 of the central computing entity 65 described above in connection with at least FIG. 1 and FIG. 2A) may conduct post-development modification operations and perform post-development testing operations on a base image associated with a software application (such as, but not limited to, a base image of an operating system, a security-patched base image of a software application, and/or the like) prior to releasing/deploying of the image onto a client system.

Referring back to FIG. 4, the example process 400 begins at step/operation 402. Subsequent to step/operation 402, the example process 400 proceeds to step/operation 404. At step/operation 404, a processing circuitry (such as, but not limited to, the processing elements 205 of the central computing entity 65 described above in connection with at least FIG. 1 and FIG. 2A) retrieves a base image.

In some embodiments, the example processing circuitry obtains (e.g., receives from a remote device) the base image. In some embodiments, the base image is associated with at least one software application. In some embodiments, the base image may include a disk image and/or a cloud image of a version of the at least one software application that has been released upon the completion of the development of the at least one software application. In some embodiments, the at least one software application is developed by a third-party software development institution.

In some embodiments, a base image of software application may include disk image of a version of the software application that is installed on a local computer system that is considered "on premises" relative to the processing circuitry (for example, the central computing entity 65). In such embodiments, the software application is installed and runs on computers on the premises (for example, local computers) of the person or organization using the software application, rather than at a remote facility (for example, from a cloud or a server farm).

For example, a Microsoft® Windows® operating system software application base image may be installed on the local computer system using a disk image file (e.g., an ISO image file); subsequently, approved security patches for the installed operating system may be installed, and the patched software application may be used to generate a visualization/emulation application (e.g., an OVA formatted software application) for the Microsoft® Windows® operating software application. As another example, an Ubuntu operating system software application base image may be installed on the local computer system using a disk image file (e.g., an ISO image file); subsequently, approved security patches for the installed operating system may be installed, and the patched software application may be used to generate a visualization/emulation application (e.g., an OVA formatted software application) for the Ubuntu operating system software application.

Additionally, or alternatively, a base image of the software application may be considered as in the cloud so as to be built using specific cloud modules. For example, in addition developing the at least one software application, the third-party institution also provides cloud operating system services as part of the cloud services provided by the third-party institution. In such example, the processing circuitry may retrieve the base image from the cloud.

For example, the base image may include a Windows® operating system base image released by Microsoft® (for example but not limited to, Windows Server 2016®, Windows Sever 2019®), formatted as an AMI file and using the Amazon Web Services (AWS). As an example, the base image may include a Windows® operating system base image released by Microsoft® (for example but not limited to, Windows Server 2016®, Windows Sever 2019®), formatted as an VMI file and using Microsoft® Azure®. As another example, the base image may include an AWS-provided AMI for Ubuntu and provided by Amazon® using AWS. As another example, the base image may include a Windows® operating system image released by Microsoft® as a VMI file and using Microsoft® Azure®. As another example, the base image may include an Ubuntu-provided AMI file for Ubuntu using Microsoft® Azure®.

In some embodiments, the processing circuitry may retrieve a plurality of base images that are associated with the same at least one software application. For example, the processing circuitry may retrieve a first base image associated with Windows Server 2016® and in the format of an OVA file, may retrieve a second base image associated with Windows Server 2016® and in the format of an AMI file, and may retrieve a third base image associated with Windows Server 2016® and in the format of a VMI file.

In some embodiments, a processing circuitry (such as, but not limited to, the processing elements 205 of the central computing entity 65 described above in connection with at least FIG. 1 and FIG. 2A) generates a base image of at least one software application. For example, in some embodiments, the processing circuitry obtains (e.g., receives from a remote device) a raw base image and performs one or more processing operations (e.g., the security updating operations described below) in order to generate the base image, details of which are described herein.

While the description above provides examples of operating systems associated with example base images, it is noted that the scope of the present disclosure is not limited to the description above. In some examples, an example base image may be associated with other software application(s).

Referring back to FIG. 4, subsequent to step/operation 404, the example process 400 proceeds to step/operation 406. At step/operation 406, a processing circuitry (such as, but not limited to, the processing elements 205 of the central computing entity 65 described above in connection with at least FIG. 1 and FIG. 2A) generates a customized base image.

In some embodiments, the processing circuitry generates the customized base image based at least in part on conducting at least one operational verification operation on the base image. For example, the processing circuitry may perform an ordered sequence of operational verification operations on the base image in order to generate a customized base image.

As described above, an operational verification operation is a data object that describes a required modification in the base image or a required testing operation for the base image. In some embodiments, generating a customized base image for a software application includes generating a modified disk image file (e.g., a modified ISO file) based at least in part on the disk image file for the software application. In some embodiments, generating a customized base image for a software application includes modifying a base image that is generated by a visualization/emulation application (for example, an OVA file, an AMI file, a VMI file, and/or the like).

In some embodiments, the at least one operational verification operation may include at least one modification operation. For example, the at least one at least one modification operation may be a customized modification operation that is specific to the at least one software application and/or the client system. Examples of customized modification operations performed by the processing circuitry (such as, but not limited to, the processing elements 205 of the central computing entity 65 described above in connection with at least FIG. 1 and FIG. 2A) include, but is not limited to, one or more per-client modification operations required for all software application deployment on the particular client system, one or more per-application modification operations required for deployment of the particular software application on any environment, and/or one or more per-client per-application modification operations required for deployment of the particular software application on the particular client system.

Additionally, or alternatively, the at least one operational verification operation may include at least one testing operation. For example, the at least one at least one testing operation may be a customized testing operation that is specific to the at least one software application and/or the client system. Examples of customized testing operations performed by the processing circuitry (such as, but not limited to, the processing elements 205 of the central computing entity 65 described above in connection with at least FIG. 1 and FIG. 2A) may include, but not limited to, one or more per-client testing operations required for all software application deployment on the particular client system, one or more per-application testing operations required for deployment of the particular software application on any environment, and/or one or more per-client per-application testing operations required for deployment of the particular software application on the particular client system.

In some embodiments, at least some of the operational verification operations are determined based at least in part on configuration modules for the software application. As described above, a configuration module may refer to a data object that describes one or more post-development modifications that should be made to a corresponding software application or an image prior to release/deployment of the software application or the image on the client system, along with one or more post-development testing procedures that correspond to the one or more post-development modifications.

As an example, a particular configuration module may require that, after installing an antivirus component (for example, a software application) on the software application corresponding to the base image (for example, the operating system corresponding to the base image), a test is performed to ensure that the antivirus component is operational and compatible with a firewall component that has been installed on the software application.

In some embodiments, configuration modules may be developed through supplying configuration files having particular configuration roles to a software provisioning, configuration management, and/or application-deployment tool, such as through files supplied to Ansible® that are marked as associated with particular Ansible® roles. The configuration modules may additionally or alternatively be defined as modules for a modular pipeline library such as Jenkins.

In some embodiments, configuration modules are based at least in part on at least one of the at least one software application associated with the base image, or the client system where the resulting validated base image (as described herein) will be released and/or developed. For example, the configuration modules may include per-application configuration modules, per-client configuration modules, and per-client per-application configuration modules.

In some embodiments, a per-application configuration module may be a data object that includes one or more post-development modifications that should be made to a corresponding software application prior to release/deployment of the software application on any client system along with one or more post-development testing procedures that correspond to the one or more post-development modifications. In some embodiments, the per-application configuration modules may be developed through supplying configuration files having particular configuration roles to a software provisioning, configuration management, and/or application-deployment tool, such as through files supplied to Ansible® that are marked as associated with particular Ansible® roles. The per-application configuration modules may additionally or alternatively be defined as modules for a modular pipeline library such as Jenkins®.

In some embodiments, per-client configuration data for the software application is a data object that describes: (i) one or more post-development modifications that should be made to any software application prior to release/deployment of the software application on a corresponding client system and/or (ii) one or more post-development testing procedures that need to be performed on any software application prior to release/deployment of the software application on the corresponding client system. For example, the client configuration module data for a corresponding client system may require that, prior to the release/deployment of any software application on the client system, the antivirus component of the software application should be replaced with an antivirus component having a particular version. As another example, the client configuration module data for a corresponding client system may require that, prior to the release/deployment of any software application on the client system, a particular security scan test should be performed on the software application.

In some embodiments, a per-client per-application configuration data for the software application and the client system is a data object that describes: (i) one or more post-development modifications that should be made to the software application prior to release/deployment of the software application on the corresponding client system, and/or (ii) one or more post-development testing procedures that need to be performed on the software application prior to release/deployment of the software application on the corresponding client system. For example, the client configuration module data for a corresponding software application and a corresponding client system may require that, prior to the release/deployment of the software application on the client system, the antivirus component of the software application should be replaced with an antivirus component having a particular version. As another example, the client configuration module data for a corresponding software application and a corresponding client system may require that, prior to the release/deployment of any software application on the client system, a particular security scan test should be performed on the software application.

Referring back to FIG. 4, subsequent to step/operation 406, the example process 400 proceeds to step/operation 408. At step/operation 408, a processing circuitry (such as, but not limited to, the processing elements 205 of the central computing entity 65 described above in connection with at least FIG. 1 and FIG. 2A) generates a validated base image.

In some embodiments, the processing circuitry generates the validated base image based at least in part on conducting at least one operational testing operation on the customized base image. As described above, an "operational testing operation" may refer to a data object that describes a universal testing that is required for all software applications and/or images associated with said software applications prior to deploying/releasing software applications and/or images to any environment (for example, any client system) to ensure that the resulting validated base image satisfies one or more requirements (for example, requirements from the enterprise environment, form the end user, and/or the like).

For example, the operational testing operation may be in the form of a general testing operation that is required for release/deployment of any software application or image on any environment. In such an example, a processing circuitry (such as, but not limited to, the processing elements 205 of the central computing entity 65 described above in connection with at least FIG. 1 and FIG. 2A) performs one or more general testing operations on the customized base image to generate a validated base image. For example, performing the general testing operations includes performing a general security scan on the customized base image.

In some embodiments, if the customized base image successfully passes the general testing operations, a processing circuitry (such as, but not limited to, the processing elements 205 of the central computing entity 65 described above in connection with at least FIG. 1 and FIG. 2A) determines that the customized base image is a validated base image. In some embodiments, if the customized base image does not successfully pass the general testing operations, a processing circuitry (such as, but not limited to, the processing elements 205 of the central computing entity 65 described above in connection with at least FIG. 1 and FIG. 2A) determines that the customized base image is not a validated base image.

In some embodiments, if the customized base image does not successfully pass the general testing operations, a processing circuitry (such as, but not limited to, the processing elements 205 of the central computing entity 65 described above in connection with at least FIG. 1 and FIG. 2A) determines that the customized base image is not a validated base image and returns the customized base image to step/operation 406 along with runtime-generated configuration modules configured to address the observed security issues of the non-validated customized base image, details of which are described herein.

Additionally, or alternatively, the operational testing operation may be in the form of an integration testing operation, details of which are described herein.

Referring back to FIG. 4, subsequent to step/operation 408, the example process 400 proceeds to step/operation 410. At step/operation 410, a processing circuitry (such as, but not limited to, the processing elements 205 of the central computing entity 65 described above in connection with at least FIG. 1 and FIG. 2A) generates a release note data object. In some embodiments, the release note data object is associated with the validated base image.

In some embodiments, the central computing entity 65 generates a release note data object for the software application. In some embodiments, the central computing entity 65 generates the release note data object based at least in part on at least one of software development data associated with the development of the software application, modular configuration data associated with the client configuration modules (e.g. client configuration module data), and/or application usage data associated with the software application.

In some embodiments, software development data may refer to one or more data objects generated based at least in part on developer activities during the development of the software application. Examples of software development data may include, but are not limited to, task ticket data generated by interacting with a software development platform (e.g., JIRA tickets), incident data generated during testing of the software application (which may occur as part of the development of the software application), configuration data generated by a software application configuration management platform (e.g., Ansible® configuration data), software development data generated by a software provisioning platform, software development data generated by an application deployment platform, and/or the like.

In some embodiments, modular configuration data or client configuration module data may describe one or more client configuration modules for at least one of the software applications and/or the client system. A client configuration module is a data object that describes desired contents of a release note data object for the software application. In some embodiments, the client configuration module is provided to a processing circuitry (such as, but not limited to, the processing elements 205 of the central computing entity 65 described above in connection with at least FIG. 1 and FIG. 2A) by a client device associated with the client system. For example, a particular client configuration module may require inclusion and/or exclusion of particular content data from the release note data object. As another example, a particular client configuration module may specify one or more hardware systems on which the software application will be deployed within the client system. In the latter example, based at least in part on the operating system specifications, the processing circuitry may exclude configuration details related to non-specified hardware systems from the generated release note data object for the software application being released/deployed on the client system.

In some embodiments, application usage data may describe which user profiles and/or client devices associated with the client system are likely to use the software application and/or have used the software application in the past. The application usage data may further describe, for each user profile and/or client device associated with the client system, a range of software application components within the software application that the user profile and/or the client device is more likely to access and/or a range of software application components within the software application that the user profile and/or the client device has used in the past.

In some embodiments, the release note data object includes a common set of content data that are provided to a set of recipient user profiles and/or a set of recipient client devices associated with the client system, where common sets of content data are determined based at least in part on the software development data and the client configuration modules while the set of recipient profiles and/or the set of recipient client devices are determined based at least in part on the application usage data. For example, the release note data object includes a common set of content data that are provided to a set of recipient user profiles and/or a set of recipient client devices associated with the client system, where a common set of content data are determined based at least in part on the software development data as updated by the client configuration modules while the set of recipient profiles and/or the set of recipient client devices are determined based at least in part on the application usage data.

In some embodiments, the release note data object defines: (i) a set of recipient user profiles and/or a set of recipient client devices associated with the client system, and (ii) for each recipient user profile and/or recipient client device, a set of content data items associated with the particular recipient user profile and/or the particular recipient client device. For example, the release note data object may define different content item segments, each associated with a recipient flag, where the recipient flag for a content item segment describes recipient user profiles and/or recipient client devices that are authorized to access the content item segment after transmission of the release note data associated with the release note data object to the client system associated with the client system.

While various embodiments of the present invention describe generating the content data associated with a release note data object based at least in part on either the combination of the software development data and the client configuration module data or the combination of the software development data, the client configuration module data, and the application usage data, the scope of the present disclosure is not limited to these examples.

In some embodiments, content data associated with a release note data object may be determined based at least in part on software development data alone and/or based at least in part on a combination of the software development data and the application usage data. For example, even if the processing circuitry (such as, but not limited to, the processing elements 205 of the central computing entity 65 described above in connection with at least FIG. 1 and FIG. 2A) is configured to generate a release note data object based at least in part on the combination of the software development data and the client configuration module data, the client configuration module data may include no information that affects the content data associated with the release note data object. As another example, in some embodiments, even if the processing circuitry (such as, but not limited to, the processing elements 205 of the central computing entity 65 described above in connection with at least FIG. 1 and FIG. 2A) is configured to generate a release note data object based at least in part on the combination of the software development data, the client configuration module data, and the application usage data, the client configuration module data and the application usage data may include no information that affects the content data associated with the release note data object.

In some embodiments, generating the release note data object comprises retrieving a release note data object template for the release note data object, where the release note data object template defines desired data item types for inclusion among the release note data object. As described above, the release note data object may have a structured document format, such as a JavaScript Object Notation (JSON) or Extensible Markup Language (XML) format, and may define desired data item types using structured tags (e.g., JSON tags or XML tags) within the structured document tag.

In some embodiments, the processing circuitry (such as, but not limited to, the processing elements 205 of the central computing entity 65 described above in connection with at least FIG. 1 and FIG. 2A) may probabilistically bind data fields inferred based at least in part on at least one of the software development data, the modular configuration data, and the application usage to each of the desired data item types using a predictive data analysis model such as a machine learning model. In some embodiments, the processing circuitry (such as, but not limited to, the processing elements 205 of the central computing entity 65 described above in connection with at least FIG. 1 and FIG. 2A) may include at least a portion of the inferred data fields among the content data for the release note data object in order to achieve a dual-optimization tradeoff scenario that seeks to maximize an average probabilistic score of the included inferred data fields, while minimizing a size of the release note data above a certain size threshold. In some embodiments, the central computing entity 65 may include a portion of the inferred data fields among the content data when the probabilistic binding scores for each inferred data field among the portion of the inferred data fields exceeds a probabilistic binding score threshold. In some embodiments, the processing circuitry (such as, but not limited to, the processing elements 205 of the central computing entity 65 described above in connection with at least FIG. 1 and FIG. 2A) may determine an ordering and/or placement of the inferred data fields among the content data associated with the release note data object based at least in part on the probabilistic binding scores of the noted inferred data fields.

Referring back to FIG. 4, subsequent to step/operation 410, the example process 400 proceeds to step/operation 412. At step/operation 412, a processing circuitry (such as, but not limited to, the processing elements 205 of the central computing entity 65 described above in connection with at least FIG. 1 and FIG. 2A) performs one or more image release operations.

In some embodiments, the processing circuitry performs the one or more image release operations by releasing the validated base image generated at step/operation 408 and the release note data object generated at step/operation 412 to at least one client system.

In some embodiments, the processing circuitry (such as, but not limited to, the processing elements 205 of the central computing entity 65 described above in connection with at least FIG. 1 and FIG. 2A) directly provides at least one of the validated base image and the release note data object to the client system through one or more networks (such as the one or more networks 135 described above in connection with at least FIG. 1).

In some embodiments, the processing circuitry (such as, but not limited to, the processing elements 205 of the central computing entity 65 described above in connection with at least FIG. 1 and FIG. 2A) provides the at least one of the validated base image and/or the release note data object as an entry in a Wiki server and/or a cloud management server (e.g., a CloudBolt) associated with the client system.

In some embodiments, the processing circuitry (such as, but not limited to, the processing elements 205 of the central computing entity 65 described above in connection with at least FIG. 1 and FIG. 2A) provides at least one of the validated base image and the release note data object to a communication platform (e.g., as a Slack channel message, an Microsoft® Outlook email, a Microsoft® Teams message, and/or the like) associated with the client system.

In some embodiments, the processing circuitry (such as, but not limited to, the processing elements 205 of the central computing entity 65 described above in connection with at least FIG. 1 and FIG. 2A) further causes installation of the validated base image on one or more computing devices associated with the client system.

Referring back to FIG. 4, subsequent to step/operation 412, the process 400 ends at step/operation 414.

b. Exemplary Base Image Generation

Figure 5:
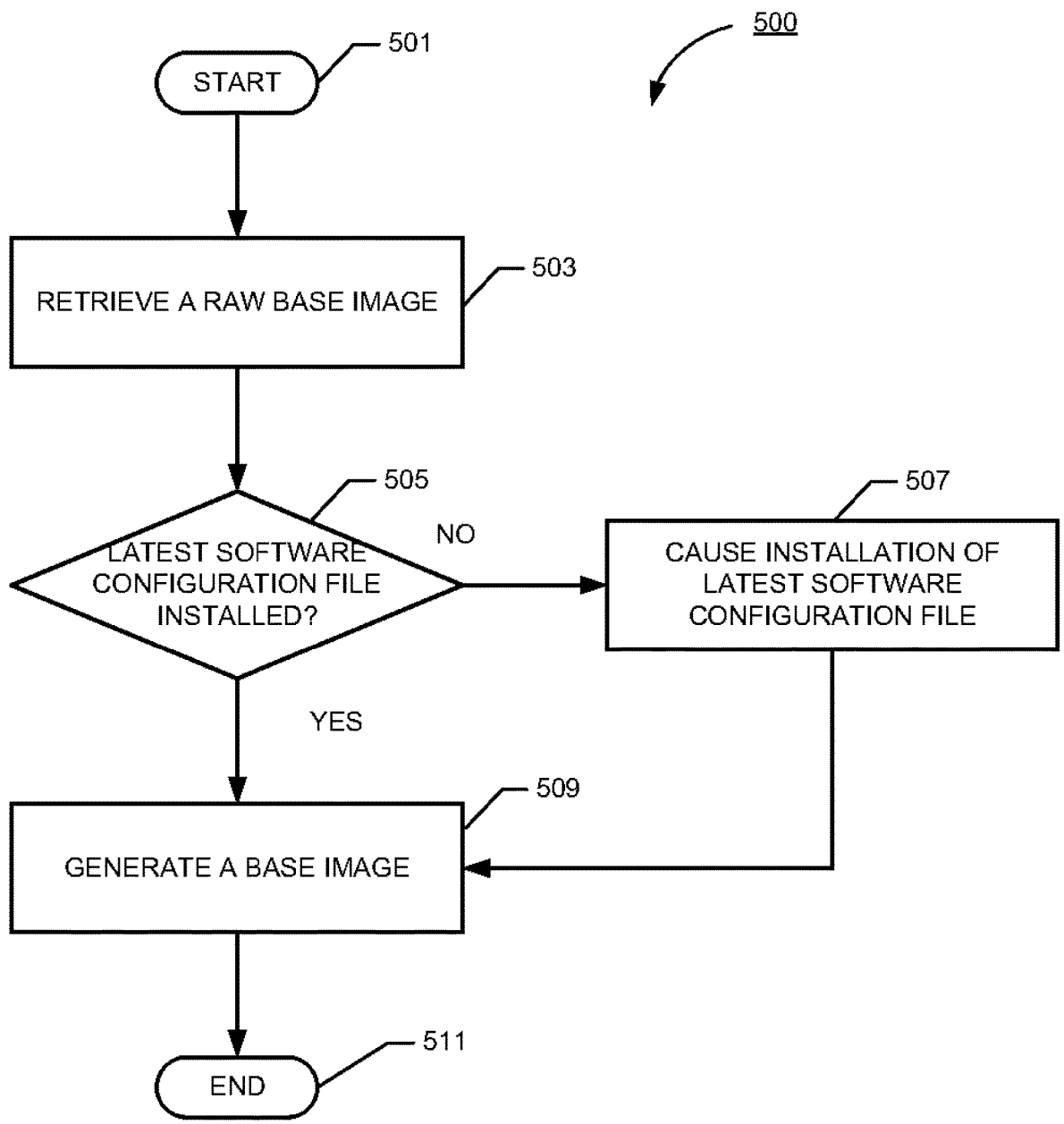
FIG. 5 is an example flowchart diagram of an example process for generating an example base image in accordance with certain embodiments of the present invention.

Referring now to FIG. 5, an example flowchart diagram is illustrated. In particular, the example flowchart diagram illustrates an example process 500 for generating an example base image in accordance with examples of the present disclosure.

In some embodiments, via the various steps/operations of the example process 500, a processing circuitry (such as, but not limited to, the processing elements 205 of the central computing entity 65 described above in connection with at least FIG. 1 and FIG. 2A) may determine whether an image comprises the latest software configuration files installed, such that the image may be provided as a base image for steps/operations illustrated above in connection with at least FIG. 4. In some embodiments, a processing circuitry (such as, but not limited to, the processing elements 205 of the central computing entity 65 described above in connection with at least FIG. 1 and FIG. 2A) may obtain (e.g., receives from a remote device) a raw base image and performs one or more processing operations (e.g., the security updating operations described below) in order to generate the base image. In some embodiments, subsequent the receiving the latest software configuration, a processing circuitry (such as, but not limited to, the processing elements 205 of the central computing entity 65 described above in connection with at least FIG. 1 and FIG. 2A) may trigger steps/operations illustrated above in connection with at least FIG. 4.

Referring back to FIG. 5, the example process 500 begins at step/operation 501. Subsequent to step/operation 501, the example process 500 proceeds to step/operation 503. At step/operation 410, a processing circuitry (such as, but not limited to, the processing elements 205 of the central computing entity 65 described above in connection with at least FIG. 1 and FIG. 2A) retrieves a raw base image.

In some embodiments, the raw base image is associated with at least one software application. As described above, the term "raw base image" may refer to an image that may or may not include all of the latest software configuration files for the software application. For example, a raw base image may be associated with an operating system, and may not include the latest security patches that fix one or more vulnerabilities in the operating system.

In some embodiments, the processing circuitry may retrieve the raw base image on premises (for example, through a local, on-premise computer network that is within the enterprise environment), similar to those described above in connection with at least step/operation 404 of FIG. 4. In some embodiments, the processing circuitry may retrieve the raw base image from a remote device (for example, from a computing cloud system), similar to those described above in connection with at least step/operation 404 of FIG. 4.

Referring back to FIG. 5, subsequent to step/operation 503, the example process 500 proceeds to step/operation 505. At step/operation 505, a processing circuitry (such as, but not limited to, the processing elements 205 of the central computing entity 65 described above in connection with at least FIG. 1 and FIG. 2A) determines whether the raw base image retrieved at step/operation 503 comprises a latest software configuration file associated with the at least one software application.

As described above, the latest software configuration file may refer to the most recent data, information, content, configuration, and/or the like that may must be installed on or be part of an image or a software application. For example, a third party provider who develops the software application may periodically release software configuration files to users (such as, but not limited to, software updates, security patches, and/or the like).

In some embodiments, the processing circuitry may determine whether the raw base image retrieved at step/operation 503 comprises the latest software configuration file based at least in part on whether a version number of the at least one software application associated with raw base image matches the latest version of the software application released by the third party provider. For example, if the latest version of the software application released by the third party provider is version 5.1, and the software application associated with raw base image is 4.2, the processing circuitry determines that the raw base image does not comprise the latest software configuration file. As another example, if the latest version of the software application released by the third party provider is version 5.1, and the software application associated with raw base image is 5.1, the processing circuitry determines that the raw base image comprises the latest software configuration file While the description above provides an example of determining whether the raw base image comprises the latest software configuration file, it is noted that the scope of the present disclosure is not limited to the description above. In some examples, the processing circuitry may determine whether the raw base image comprises the latest software configuration file through other methods. For example, the processing circuitry may determine whether the third party provider has released a new software configuration file associated with the software application since the last software configuration file was installed on the software application. If so, the processing circuitry determines that the raw base image does not comprise the latest software configuration file. If not, the processing circuitry determines that the raw base image comprises the latest software configuration file.

Referring back to FIG. 5, if, at step/operation 505, the processing circuitry determines that the latest software configuration file is installed on the raw base image retrieved at step/operation 503, the example process 500 proceeds to step/operation 509. At step/operation 509, a processing circuitry (such as, but not limited to, the processing elements 205 of the central computing entity 65 described above in connection with at least FIG. 1 and FIG. 2A) determines that the raw base image is a base image suitable for steps/operations illustrated and described above in connection with at least FIG. 4.

As described above, a base image of a software application may include all of the latest software configuration files for the software application. For example, a Microsoft® Windows® release may include the latest security patches for the released software application. As another example, an Ubuntu release may include the latest security patches for the released software application. In such examples, because the latest security patches have been installed, the processing circuitry determines that the raw base image is a base image suitable for steps/operations illustrated and described above in connection with at least FIG. 4.

Referring back to FIG. 5, if, at step/operation 505, the processing circuitry determines that the latest software configuration file is not installed on the raw base image retrieved at step/operation 503, the example process 500 proceeds to step/operation 507. At step/operation 507, a processing circuitry (such as, but not limited to, the processing elements 205 of the central computing entity 65 described above in connection with at least FIG. 1 and FIG. 2A) causes installation of the latest software configuration file.

In some embodiments, a raw base image of a software application may not include all of the latest software configuration files for the software application, and processing circuitry is configured to update the raw base image of the software application by retrieving the latest software configuration file and installing the required latest software configuration file for the software application (prior to pipelined software release of the software application base image).

For example, a processing circuitry (such as, but not limited to, the processing elements 205 of the central computing entity 65 described above in connection with at least FIG. 1 and FIG. 2A) may retrieve the latest security patches and update a Windows® operating system base image release in order to generate the Windows® operating system base image based at least in part on a raw base image for the Windows® operating system. As another example, a processing circuitry (such as, but not limited to, the processing elements 205 of the central computing entity 65 described above in connection with at least FIG. 1 and FIG. 2A) may retrieve and update the latest security patches for an Ubuntu operating system base image release in order to generate the Ubuntu operating system base image based at least in part on a raw base image for the Ubuntu operating system.

Referring back to FIG. 5, subsequent to step/operation 507, the example process 500 proceeds to step/operation 509. At step/operation 509, a processing circuitry (such as, but not limited to, the processing elements 205 of the central computing entity 65 described above in connection with at least FIG. 1 and FIG. 2A) generates a base image.

For example, in response to determining that the raw base image retrieved at step/operation 503 does not comprise the latest software configuration file, the processing circuitry causes installation of the latest software configuration file on the raw base image to generate the base image. As another example, in response to determining that the raw base image retrieved at step/operation 503 comprises the latest software configuration file, the processing circuitry determines that the raw base image is a suitable base image.

Referring back to FIG. 5, subsequent to step/operation 509, the example process 500 proceeds to step/operation 511 and ends.

c. Exemplary Validated Base Image Generation

Figure 6:
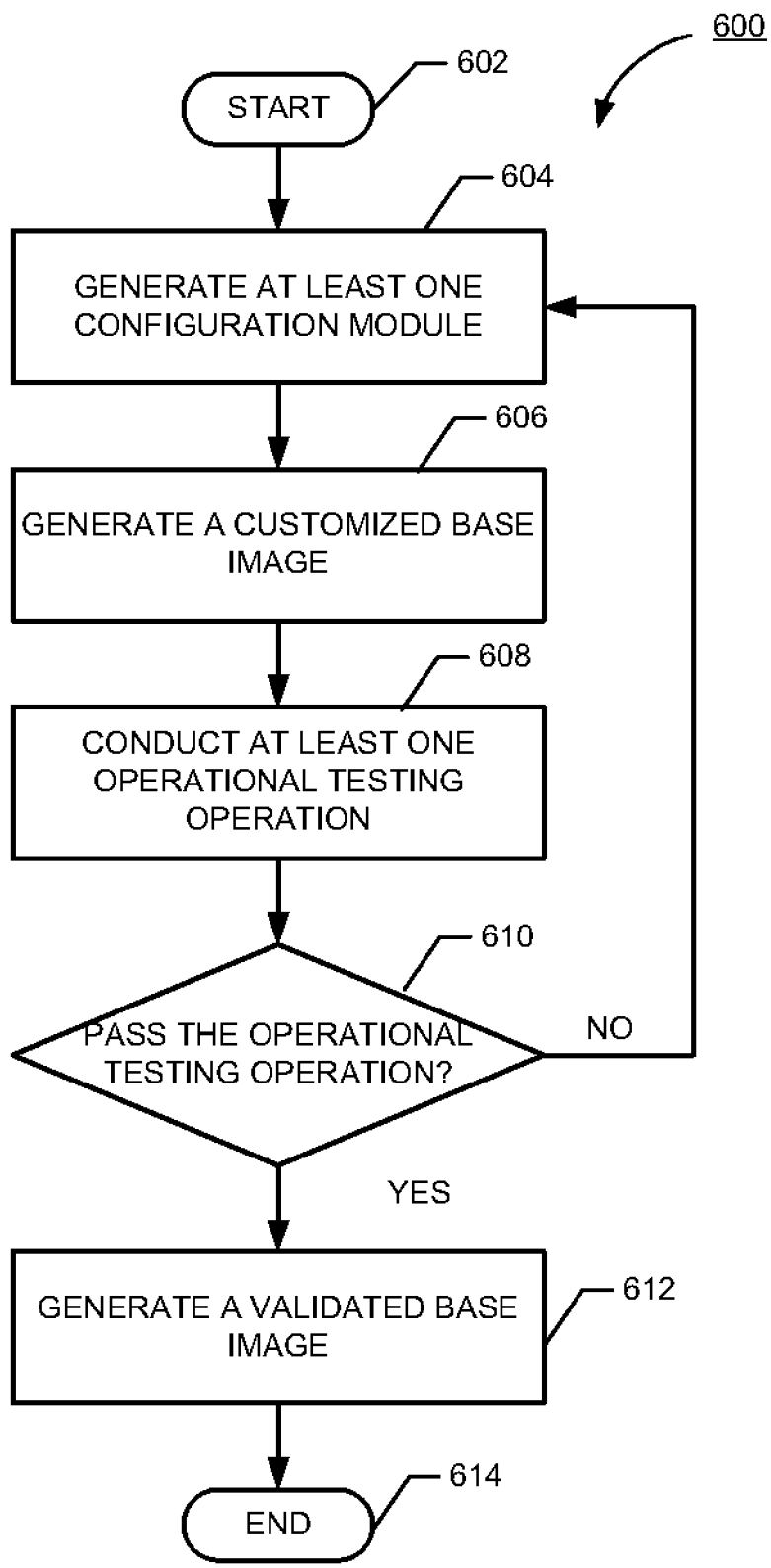
FIG. 6 is an example flowchart diagram of an example process for generating an example validated base image in accordance with certain embodiments of the present invention.

Referring now to FIG. 6, an example flowchart diagram is illustrated. In particular, the example flowchart diagram illustrates an example process 600 for generating a validated base image in accordance with examples of the present disclosure.

In some embodiments, via the various steps/operations of the example process 600, a processing circuitry (such as, but not limited to, the processing elements 205 of the central computing entity 65 described above in connection with at least FIG. 1 and FIG. 2A) may performing operational testing operation(s) (such as, but not limited to, general testing operations and/or integration testing operations) on a customized base image to generate a validated base image. In some embodiments, if the customized base image fails the operational testing operation(s), the processing circuitry may be configured to generate a new customized base image.

Referring now FIG. 6, the example process 600 begins at step/operation 602. Subsequent to step/operation 602, the example process 600 proceeds to step/operation 604. At step/operation 604, a processing circuitry (such as, but not limited to, the processing elements 205 of the central computing entity 65 described above in connection with at least FIG. 1 and FIG. 2A) generates at least one configuration module.

As described above, the configuration module may refer to a data object that describes one or more post-development modifications that should be made to a corresponding software application or an image prior to release/deployment of the software application or the image on the client system, along with one or more post-development testing procedures that correspond to the one or more post-development modifications. For example, the configuration module may describe one or more modification operations on the base image to generate a customized base image, similar to those described above in connection with at least step/operation 406 of FIG. 4.

For example, the configuration module describes at least one customized modification operation, and the processing circuitry is configured to conduct the at least one customized modification operation on the base image. Additionally, or alternatively, the configuration module describes at least one customized testing operation, and the processing circuitry is configured to conduct the at least one customized testing operation on the base image.

Referring back to FIG. 6, subsequent to step/operation 604, the example process 600 proceeds to step/operation 606. At step/operation 606, a processing circuitry (such as, but not limited to, the processing elements 205 of the central computing entity 65 described above in connection with at least FIG. 1 and FIG. 2A) generates a customized base image.

In some embodiments, the processing circuitry may generate the customized base image based at least in part on conducting at least one operational verification operation on a base image, similar to those described above in connection with at least step/operation 406 of FIG. 4.

Referring back to FIG. 6, subsequent to step/operation 606, the example process 600 proceeds to step/operation 608. At step/operation 608, a processing circuitry (such as, but not limited to, the processing elements 205 of the central computing entity 65 described above in connection with at least FIG. 1 and FIG. 2A) conducts at least one operational testing operation on the customized base image.

As described above, the at least one operational testing operation may refer to a data object that describes a universal testing that is required for all software applications and/or images associated with said software applications prior to deploying/releasing software applications and/or images to any environment (for example, any client system) to ensure that the resulting validated base image satisfies one or more requirements (for example, requirements from the enterprise environment, form the end user, and/or the like).

In some embodiments, the at least one operational testing operation comprises at least one general testing operation that is required for release/deployment of any software application or image on any environment. Additionally, or alternatively, the at least one operational testing operation comprises at least one integration testing operation that tests the compatibilities of various modification operations (for example, those described in the configuration module) that have been conducted on the raw base image.

Referring back to FIG. 6, subsequent to step/operation 608, the example process 600 proceeds to step/operation 610. At step/operation 610, a processing circuitry (such as, but not limited to, the processing elements 205 of the central computing entity 65 described above in connection with at least FIG. 1 and FIG. 2A) determines whether the customized base image passes the at least one operational testing operation.

In some embodiments, the processing circuitry may determine whether the customized base image passes the at least one operational testing operation based at least in part on whether an error message or any issue is identified after the at least one operational testing operation. If there is an error message or an issue, the processing circuitry determines that the customized base image does not pass the at least one operational testing operation. If there is no error message and issue, the processing circuitry determines that the customized base image passes the at least one operational testing operation.

For example, the at least one operational testing operation may include a general security scan on the customized base image. In this example, the general security scan may test the customized base image using known vulnerabilities. After the processing circuitry conducts the general security scan on the customized base image, the processing circuitry may generate a analytical report that may describe one or more positional issues (for example, based at least in part on the known vulnerabilities) on the customized base image. If there is any issue identified in the analytical report, the processing circuitry may determine that the customized base image does not pass the at least one operational testing operation. If there is no issue identified in the analytical report, the processing circuitry may determine that the customized base image passes the at least one operational testing operation.

Referring back to FIG. 6, if, at step/operation 610, the processing circuitry determines that the customized base image passes the at least one operational testing operation, the example process 600 proceeds to step/operation 612. At step/operation 612, a processing circuitry (such as, but not limited to, the processing elements 205 of the central computing entity 65 described above in connection with at least FIG. 1 and FIG. 2A) determines that the customized base image is a validated base image suitable for releasing/deploying to client systems in accordance with those described in connection with at least FIG. 4.

If, at step/operation 610, the processing circuitry determines that the base image does not pass the at least one operational testing operation, the example process 600 returns to step/operation 604. At step/operation 604, a processing circuitry (such as, but not limited to, the processing elements 205 of the central computing entity 65 described above in connection with at least FIG. 1 and FIG. 2A) may generate at least one updated configuration module. Subsequently, at step/operation 606, the processing circuitry may generate an updated customized base image based at least in part on the at least one updated configuration module.

In some embodiments, in response to determining that the customized base image does not pass the at least one operational testing operation, the processing circuitry generates at least one updated configuration module based at least in part on the operational testing operation of step/operation 608. For example, the updated configuration module may comprise modification operations to address error(s) and/or issue(s) that has been identified through conducting the operational testing operation. Subsequently, the processing circuitry may generate an updated customized base image based at least in part on the updated configuration module at step/operation 606, so that the updated customized base image passes the operational testing operation at step/operation 608. In some embodiments, step/operation 604, step/operation 606, and step/operation 608 of FIG. 6 may be repeated until the customized base image passes the operational testing operation at step/operation 610.

In some embodiments, performing the general testing operations and/or the integration testing operations after customization operations reduces the need for double-general-testing of the software applications. Without a coherent scheme for performing customized (e.g., per-application, per-client, both per-application and per-client, and/or the like) modifications and testing operations prior to the generalized testing operations, it would not be guaranteed that general testing operations and/or the integration testing operations are being performed on a customized base image that will not go through further customizations. This lack of operational guarantee can cause significant efficiency and/or reliability challenges for any pipelined software application release solution. Accordingly, by providing an operational guarantee of sequential performance of general testing operations and/or the integration testing operations after performing customized modifications, various embodiments of the present invention make important technical contribution to improving efficiency and/or reliability challenges for any potentially-existing pipelined software application release solutions.

Referring back to FIG. 6, subsequent to step/operation 612, the example process 600 ends at step/operation 614.

d. Exemplary Software Application Release Operation

Figure 7:
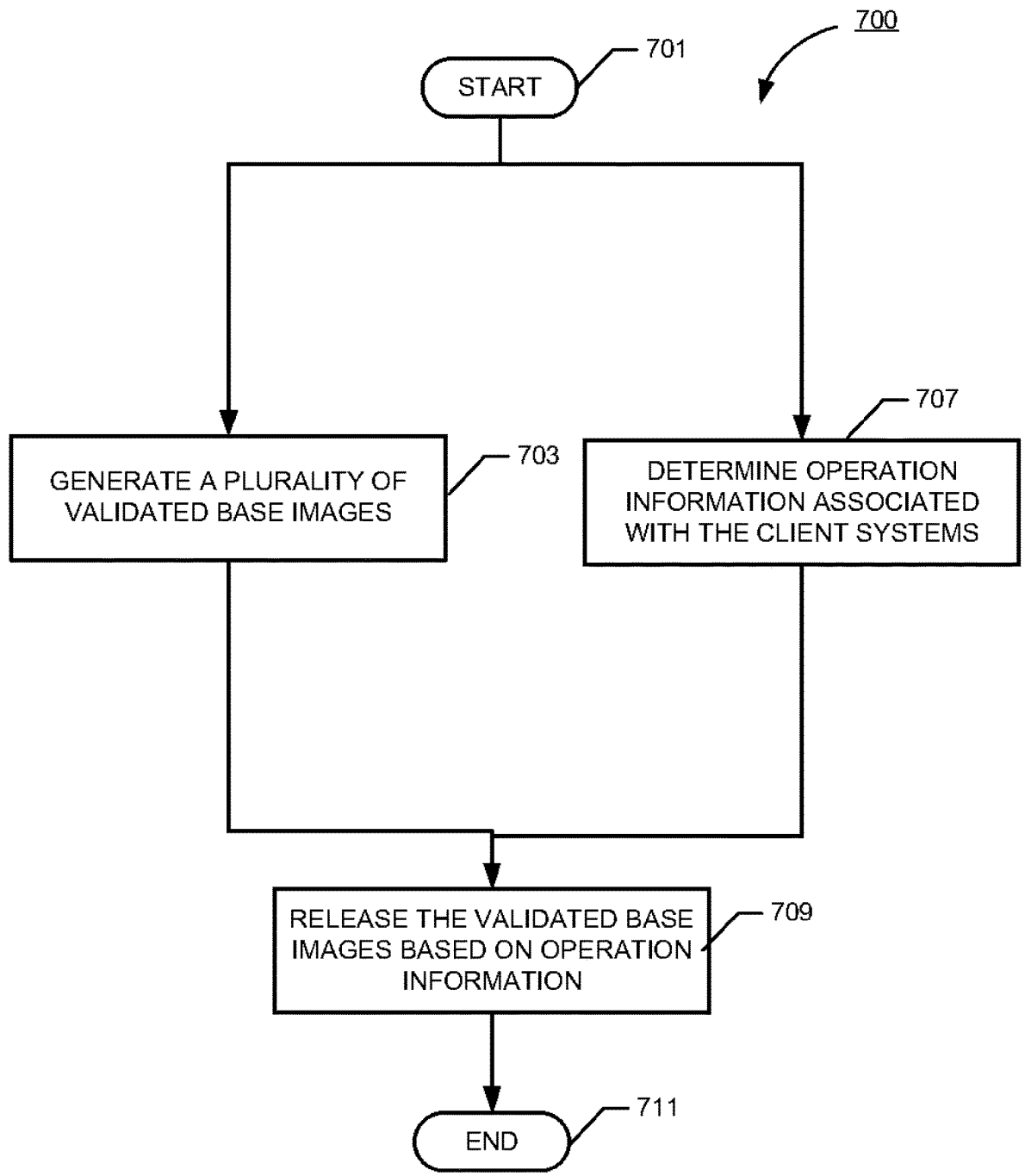
FIG. 7 is an example flowchart diagram of an example process for conducting an example software application release operation in accordance with certain embodiments of the present invention.

Referring now to FIG. 7, an example flowchart diagram is illustrated. In particular, the example flowchart diagram illustrates an example process 700 for perform one or more image release operations in accordance with examples of the present disclosure.

In some embodiments, via the various steps/operations of the example process 700, a processing circuitry (such as, but not limited to, the processing elements 205 of the central computing entity 65 described above in connection with at least FIG. 1 and FIG. 2A) may release/deploy a plurality of validated base images (along with corresponding release note data objects) that are associated with the same software application or different software applications to a plurality of client system(s) that may be associated with different operating systems and/or distributed at different cloud environment, computing systems and/or services.

Referring now FIG. 7, the example process 700 begins at step/operation 701. Subsequent to step/operation 701, the example process 700 proceeds to step/operation 703. At step/operation 703, a processing circuitry (such as, but not limited to, the processing elements 205 of the central computing entity 65 described above in connection with at least FIG. 1 and FIG. 2A) generates a plurality of validated base images.

In some embodiments, the processing circuitry may generate the plurality of validated base images similar to those described above in connection with at least FIG. 4 to FIG. 6. In some embodiments, the plurality of validated base images may be in a variety of different formats. In some embodiments, the plurality of validated base images are associated with the same at least one software application.

For example, a first validated base image of the plurality of validated base images may be generated and formatted as an OVA file. Additionally, or alternatively, a second validated base image of the plurality of validated base images may be generated and formatted as an AMI file. Additionally, or alternatively, a third validated base image of the plurality of validated base images may be generated and formatted as a VMI file. In some embodiments, the first validated base image, the second validated base image, and the third validated base image are associated with the same at least one software application (for example, an operating system such at Windows Server 2016®).

Referring back to FIG. 7, subsequent to step/operation 701, the example process 700 proceeds to step/operation 707. At step/operation 707, a processing circuitry (such as, but not limited to, the processing elements 205 of the central computing entity 65 described above in connection with at least FIG. 1 and FIG. 2A) determines operation information associated with each of a plurality of client systems.

In some embodiments, operation information may include information such as, but not limited to, whether the client system is distributed on premises or in a cloud environment (and which cloud environment that the client system is distributed in). In some embodiments, the processing circuitry may store information associated with a plurality of the client systems in a storage media (such as, but not limited to, the memory media 206 illustrated and described above in connection with at least FIG. 1 and FIG. 2B). In such embodiments, the processing circuitry may retrieve the operation system and/or cloud environment information associated with a plurality of the client systems from the storage media.

Continuing from the example above, the processing circuitry may determine that a first client system is on premise and within the local computing network. Additionally, or alternatively, the processing circuitry may determine that a second client system is distributed through AWS. Additionally, or alternatively, the processing circuitry may determine that a third client system is distributed through Microsoft® Azure®.

Referring back to FIG. 7, subsequent to step/operation 703 and step/operation 707, the example process 700 proceeds to step/operation 709. At step/operation 709, a processing circuitry (such as, but not limited to, the processing elements 205 of the central computing entity 65 described above in connection with at least FIG. 1 and FIG. 2A) releases/deploys the validated base images to the client systems based at least in part on the operation information.

In some embodiments, the processing circuitry may determine which format of the validated base image to be released or deployed to a client system based at least in part on the operation information of the client system.

Continuing from the example above, if the operation information indicates that the first client system is on premises, the processing circuitry may release/deploy the validated base image in the format of an OVA file to the first client system. Additionally, or alternatively, if the operation information indicates that the second client system is distributed through AWS, the processing circuitry may release/deploy the validated base image in the format of an AMI file to the second client system. Additionally, or alternatively, if the operation information indicates that the third client system is distributed through Microsoft® Azure®, the processing circuitry may release/deploy the validated base image in the format of a VMI file to the third client system.

Referring back to FIG. 7, subsequent to step/operation 709, the example process 700 proceeds to step/operation 711 and ends.

In some embodiments, the processing circuitry (such as, but not limited to, the processing elements 205 of the central computing entity 65 described above in connection with at least FIG. 1 and FIG. 2A) is configured to: retrieve software development data associated with a software application; receive modular configuration data from a client system; determine application usage data based at least in part on a user profile of the client system that is associated with the software application; generate a release note data object based at least in part on at least one of the software development data, the modular configuration data, and the application usage data; and perform one or more software application release operations by transmitting the release note data object to the client system.

In some embodiments, the processing circuitry (such as, but not limited to, the processing elements 205 of the central computing entity 65 described above in connection with at least FIG. 1 and FIG. 2A) is further configured to: retrieve software development data associated with a software application; receive modular configuration data from a client system; determine application usage data based at least in part on a user profile of the client system that is associated with the software application; generate a release note data object based at least in part on at least one of the software development data, the modular configuration data, and the application usage data; and perform one or more software application release operations by transmitting the release note data object to the client system.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus comprising at least one processor and at least one non-transitory memory comprising a computer program code, the at least one non-transitory memory and the computer program code configured to, with the at least one processor, cause the apparatus to:
    retrieve a base image associated with a target software application;
    generate, prior to performance of one or more release operations, a customized base image based at least in part on conducting a group of operational verification operations on the base image, wherein: (i) the group of operational verification operations comprises a group of software modification operations and a group of post-modification integration testing operations that are performed subsequent to the group of software modification operations to ensure that the group of software modification operations have been successfully executed, (ii) the group of software modification operations comprises one or more per-client modification operations associated with all software applications deployed on a target client system, one or more per-application modification operations associated with all deployments of the target software application, and one or more per-client per-application modification operations associated with all deployments of the target software application on the target client system;
    generate, prior to the performance of one or more release operations, a validated base image based at least in part on conducting a group of customized testing operations on the customized base image, wherein the group of customized testing operations comprises one or more per-client testing operations associated with all software applications deployed on the target client system, one or more pre-application testing operations associated with all deployments of the target software application, and one or more per-client per-application testing operations associated with all deployments of the target software application on the target client system;
    generate, prior to the performance of one or more release operations, a release note data object associated with the validated base image by retrieving a release note data object template defining content data to be included in the release note data object and generating the release note data object including the content data defined by the release note data object template; and
    perform one or more image release operations by releasing the validated base image and for deployment on the target client system the release note data object to the target client system.

2. The apparatus of claim 1, wherein, when retrieving the base image associated with the target software application, the at least one non-transitory memory and the computer program code are configured to, with the at least one processor, cause the apparatus to:
    retrieve a raw base image associated with the target software application;
    determine whether the raw base image comprises a latest software configuration file associated with the target software application; and
    in response to determining that the raw base image does not comprise the latest software configuration file, cause installation of the latest software configuration file on the raw base image to generate the base image.

3. The apparatus of claim 1, wherein, when generating the customized base image, the at least one non-transitory memory and the computer program code are configured to, with the at least one processor, cause the apparatus to:
    generate at least one configuration module based at least in part on at least one of the target software application or the target client system.

4. The apparatus of claim 3, wherein the at least one configuration module describes at least one customized modification operation, wherein the at least one non-transitory memory and the computer program code are configured to, with the at least one processor, cause the apparatus to:
    conduct the at least one customized modification operation on the base image.

5. The apparatus of claim 3, wherein the at least one configuration module describes at least one customized testing operation, wherein the at least one non-transitory memory and the computer program code are configured to, with the at least one processor, cause the apparatus to:
    conduct the at least one customized testing operation on the base image.

6. The apparatus of claim 1, wherein to generate the validated base image is further based at least in part on conducting at least one operational testing operation comprising at least one general testing operation.

7. The apparatus of claim 1, wherein to generate the validated base image is further based at least in part on conducting at least one operational testing operation comprising at least one integration testing operation.

8. The apparatus of claim 1, wherein, when generating the validated base image, the at least one non-transitory memory and the computer program code are configured to, with the at least one processor, cause the apparatus to:
    determine whether the customized base image passes at least one operational testing operation; and
    in response to determining that the customized base image does not pass the at least one operational testing operation, generate at least one configuration module based at least in part on the at least one operational testing operation.

9. A computer-implemented method comprising:
    retrieving a base image associated with a target software application;

generating, prior to performing one or more release operations, a customized base image based at least in part on conducting a group of operational verification operations on the base image, wherein: (i) the group of operational verification operations comprises a group of software modification operations and a group of post-modification integration testing operations that are performed subsequent to the group of software modification operations to ensure that the group of software modification operations have been successfully executed, (ii) the group of software modification operations comprises one or more per-client modification operations associated with all software applications deployed on a target client system, one or more per application modification operations associated with all deployments of the target software application, and one or more per-client per-application modification operations associated with all deployments of the target software applications on the target client system;

generating, prior to the performing one or more release operations, a validated base image based at least in part on conducting a group of customized testing operations on the customized base image, wherein the group of customized testing operations comprises one or more per-client testing operations associated with all software applications deployed on the target client system, one or more per-application testing operations associated with all deployments of the target software application, and one or more per-client per-application testing operations associated with all deployments of the target software application on the target client system;

generating, prior to the performing one or more release operations, a release note data object associated with the validated base image by retrieving a release note data object template defining content data to be included in the release note data object and generating the release note data object including the content data defined by the release note data object template; and performing one or more image release operations by releasing the validated base image for deployment on the target client system and the release note data object to the target client system.

10. The computer-implemented method of claim 9, wherein retrieving the base image associated with the target software application further comprises:
retrieving a raw base image associated with the target software application;
determining whether the raw base image comprises a latest software configuration file associated with the target software application; and
in response to determining that the raw base image does not comprise the latest software configuration file, causing installation of the latest software configuration file on the raw base image to generate the base image.

11. The computer-implemented method of claim 9, wherein generating the customized base image further comprises:
generating at least one configuration module based at least in part on at least one of the target software application or the target client system.

12. The computer-implemented method of claim 11, wherein the at least one configuration module describes at least one customized modification operation, wherein the computer-implemented method further comprises:
conducting the at least one customized modification operation on the base image.

13. The computer-implemented method of claim 11, wherein the at least one configuration module describes at least one customized testing operation, wherein the computer-implemented method further comprises:
conducting the at least one customized testing operation on the base image.

14. The computer-implemented method of claim 9, wherein generating the validated base image is further based at least in part on conducting at least one operational testing operation comprises at least one general testing operation.

15. The computer-implemented method of claim 9, wherein generating the validated base image is further based at least in part on conducting at least one operational testing operation comprises at least one integration testing operation.

16. The computer-implemented method of claim 9, wherein generating the validated base image further comprises:
determining whether the customized base image passes at least one operational testing operation; and
in response to determining that the customized base image does not pass the at least one operational testing operation, generating at least one configuration module based at least in part on the at least one operational testing operation.

17. A computer program product comprising at least one non-transitory computer-readable storage medium having computer-readable program code portions stored therein, the computer-readable program code portions comprising an executable portion configured to:
retrieve a base image associated with a target software application;
generate, prior to performance of one or more release operations, a customized base image based at least in part on conducting a group of operational verification operations on the base image, wherein: (i) the group of operational verification operations comprises a group of software modification operations and a group of post-modification integration testing operations that are performed subsequent to the group of software modification operations to ensure that the group of software modification operations have been successfully executed, (ii) the group of software modifications operations comprises one or more per-client modification operations associated with all software applications deployed on a target client system, one or more per-application modification operations associated with all deployments of the target software application, and one or more per-client per application modification operations associated with all deployments of the target software application on the target client system;
generate, prior to the performance of one or more release operations, a validated base image based at least in part on conducting a group of customized testing operations on the customized base image, wherein the group of customized testing operations comprises one or more per-client testing operations associated with all software applications deployed on the target client system, one or more per-application testing operations associated with all deployments of the target software application, and one or more per-client per-application testing operations associated with all deployments of the target software application on the target client system;
generate, prior to the performance of one or more release operations, a release note data object associated with the validated base image by retrieving a release note data object template defining content data to be included in the release note data object and generating the release note data object including the content data defined by the release note data object template; and perform one or more image release operations by releasing the validated base image for deployment on the target client system and the release note data object to the target client system.

18. The computer program product of claim 17, wherein, when retrieving the base image associated with the target software application, the computer-readable program code portions comprise the executable portion configured to:

retrieve a raw base image associated with the target software application;

determine whether the raw base image comprises a latest software configuration file associated with the target software application; and in response to determining that the raw base image does not comprise the latest software configuration file, cause installation of the latest software configuration file on the raw base image to generate the base image.

19. The computer program product of claim 17, wherein, when generating the customized base image, the computer-readable program code portions comprise the executable portion configured to:

generate at least one configuration module based at least in part on at least one of the target software application or the target client system.

20. The computer program product of claim 19, wherein the at least one configuration module describes at least one customized modification operation, the computer-readable program code portions comprise the executable portion configured to:

conduct the at least one customized modification operation on the base image.

\* \* \* \* \*